United States Patent [19]

Wilhelm

[11] Patent Number: 4,896,897
[45] Date of Patent: Jan. 30, 1990

[54] ARTICLE CARRYING CART

[76] Inventor: Paul K. Wilhelm, c/o Clipper Products, P.O. Box 30388, Cincinnati, Ohio 45230

[21] Appl. No.: 265,493
[22] Filed: Nov. 1, 1988
[51] Int. Cl.$^4$ .............................................. B62B 1/08
[52] U.S. Cl. .................................... 280/655; 280/47.2; 280/47.28; 280/47.29
[58] Field of Search .................. 280/655, 47.27, 47.28, 280/47.2, 47.29, 654

[56] References Cited

U.S. PATENT DOCUMENTS

| 3,998,476 | 12/1976 | Kazmark | 280/655 |
| 4,618,035 | 10/1986 | Mao | 280/655 |
| 4,630,837 | 12/1986 | Kazmark | 280/655 |

Primary Examiner—David M. Mitchell
Attorney, Agent, or Firm—Frost & Jacobs

[57] ABSTRACT

A lightweight portable article carrying cart. The cart comprises a main frame made up of two upright tubular members and rod-like braces to maintain them in parallel space relationship. The main frame is provided with a pair of wheels and a lower load carrying platform shiftable between a load carrying position and a stowed position. The main frame is provided with a telescoping handle assembly comprising a telescoping three piece tubular assembly supported by each of the main frame tubular members. The upper ends of the three piece tubular assemblies are joined by a grip. The tubular members of the three piece tubular assemblies are provided with locking detents which lock the handle assembly in its extended position. The handle assembly carries a single release bar shiftable between a normal position and a depressed, unlatching position. When the bar is shifted from its normal position to its unlatching position by the cart operator's hand or foot, the telescoping handle assembly can be shifted from its extended to its retracted position. The release bar is biased to its normal position and returns thereto automatically. The cart can be provided with an auxiliary rear wheel assembly so that the cart is supported by four wheels when carrying a load having a high center of gravity. The cart may also be provided with an upper article carrying tray, an upper undercarriage which can be rolled beneath a preloaded tray which can thereafter be secured to the cart, and a lower auxiliary wheeled platform for heavy, low center of gravity loads. All attachments can be affixed to and removed from the cart with a minimum of manipulative steps and without the use of tools.

14 Claims, 14 Drawing Sheets

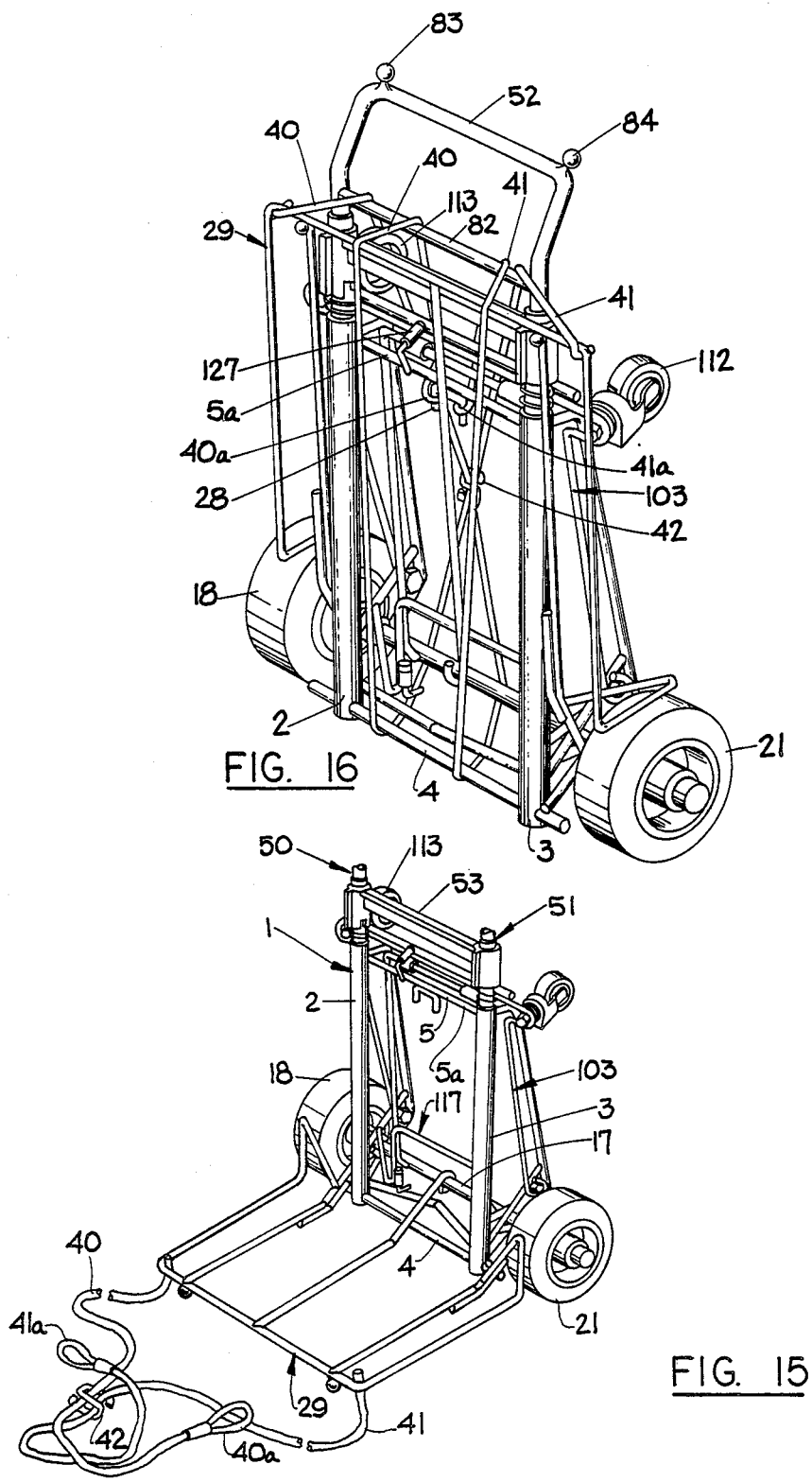

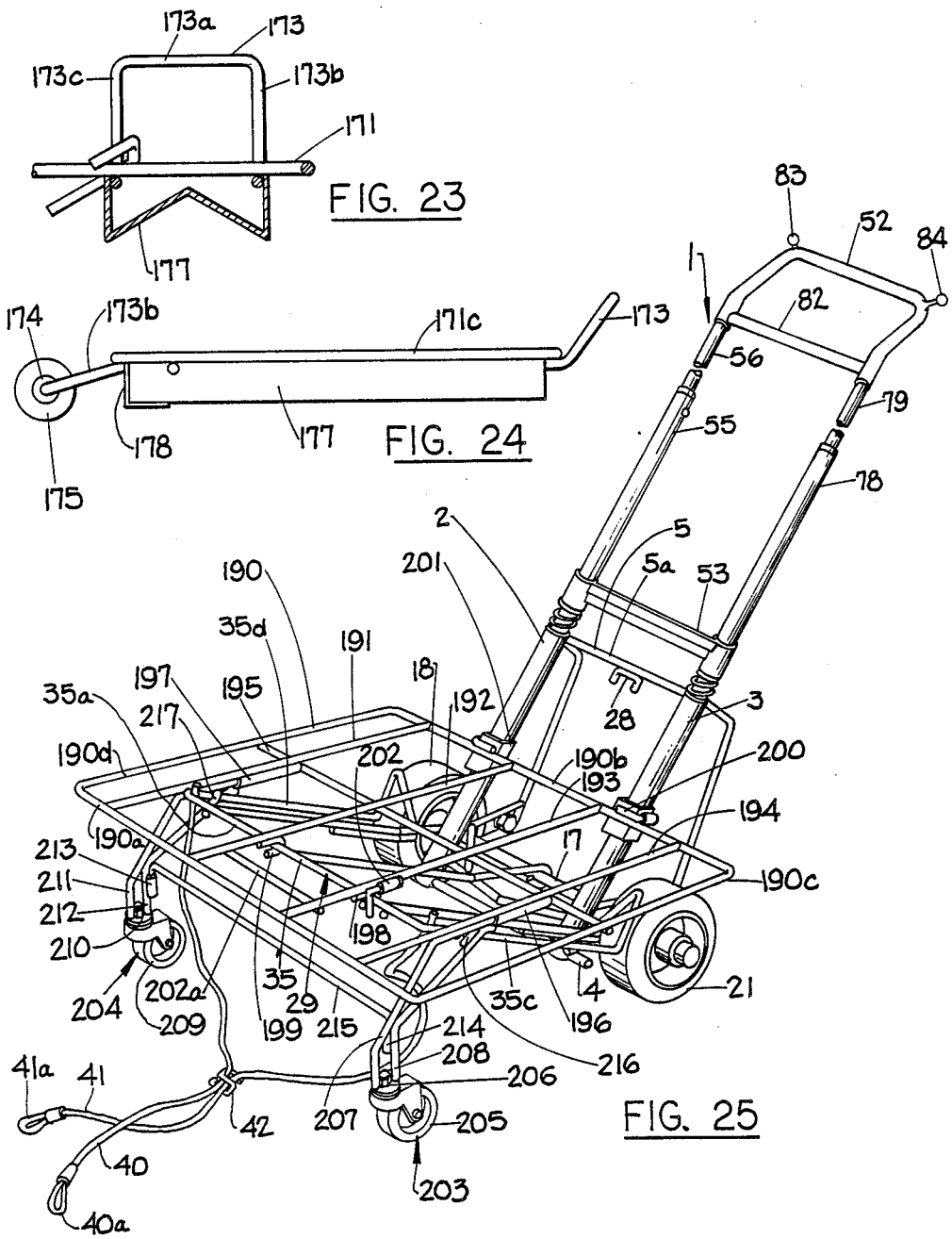

ARTICLE CARRYING CART

TECHNICAL FIELD

The invention relates to a lightweight, two-wheel, portable, article carrying cart with a telescoping handle assembly, and more particularly to such a cart having an improved handle release system, an improved auxiliary rear wheel assembly, and a plurality of attachments to provide a versatile carrying system.

BACKGROUND ART

Prior art workers have developed many types of collapsible, portable, article carrying carts for many purposes. Such carts are used, for example, to carry luggage, sample cases, office equipment, electronic equipment, and the like. Examples of collapsible article carrying carts are taught in U.S. Pat. Nos. 3,998,476 and 4,630,837.

Prior art carts of the type to which the present invention is directed are generally characterized by one or more drawbacks. For example, some carts of this type are provided with a single handle element, but have been found to be difficult to manipulate, particularly under heavier loads. Handle assemblies have been devised incorporating a pair of telescoping tube assemblies joined at their upper ends by a grip member. Latch means are provided to lock the telescoping tube assemblies in their extended positions. Such structures are frequently awkward and difficult to unlatch, in order to collapse the handle assembly to its retracted position. The above-mentioned U.S. Pat. No. 3,998,476 teaches an improved release mechanism for a telescoping handle assembly made up of two telescoping tubular assemblies, but a number of manipulative steps are still required to release the handle assembly and shift it to its retracted position.

The main frame portion of many of the prior art carts incorporate sheet steel or cast metal parts for strength, but these parts add considerably to the weight of the cart.

Many of the prior art carts are single purpose carts. Those carts provided with various attachments for greater versatility either require that the attachments be permanent parts of the cart or require tools for their attachment to and removal from the cart. Finally, many prior art cart structures employ elastic cords by which the cart load can be secured in place. Typically, one end of each cord is anchored to a part of the cart. The other end of each cord is provided with a hook member adapted to engage one or more parts of the cart. A problem with this arrangement lies in the fact that should the elastic cord inadvertently become unhooked, or slip from the cart operator's hand during the tiedown procedure, the hooks can be propelled at high speed by the elastic cords to which they are affixed and constitute a danger, which can lead to damage or injury.

The present invention is based upon the discovery that a cart can be made of rod stock, tubing and plastic elements which is very strong, light weight and capable of supporting and transporting loads in the neighborhood of 300 pounds. The cart of the present invention is provided with a telescoping handle assembly made up of a pair of telescoping tubular assemblies joined at their upper ends by a grip member. While the various tubular members are lockable in their extended positions, a greatly simplified unlocking system is provided, making shifting of the handle assembly to its retracted position extremely easy and convenient. The cart of the present invention is provided with an auxiliary rear wheel system which can be applied to the cart without tools and which can easily be collapsed to a stowed position on the cart, or removed from the cart, again without use of tools. The present invention further contemplates other attachments to be described hereinafter, which can be affixed to and removed from the cart with a minimum of simple manipulative steps, and without the use of tools These attachments make the cart a very versatile carrying system. Finally, the cart is provided with elastic security cords. The free ends of the cords are formed into loops which cooperate with cleats on the cart, thereby eliminating the danger of elastic cords terminating in hooks.

DISCLOSURE OF THE INVENTION

According to the invention there is provided an article carrying cart comprising a main frame supported by a pair of wheels and supporting a platform shiftable between a load carrying position and a stowed position. The main frame is provided with a telescoping handle assembly made up of two telescoping tubular assemblies, the upper ends of which are joined by the grip. The tubular members of the tubular assemblies are provided with locking detents which lock the handle assembly in its extended position. The handle assembly carries a single release bar shiftable between a normal position and a depressed, unlatching position as is known. When the bar is shifted from its normal position to its unlatching position by the cart operator's hand or foot, the telescoping handle assembly can be shifted from its extended to its retracted position. The release bar has been modified so as to be biased to its normal position and returns thereto automatically. This greatly simplifies the shifting of handle assembly between its extended and retracted positions from the operator's standpoint.

The cart can be provided with an auxiliary rear wheel assembly so that the cart is supported by four wheels when carrying a load having a high center of gravity. The auxiliary rear wheel system can be attached to and removed from the cart without the use of tools or the like. In addition, the auxiliary rear wheel system is also foldable to a stored position on the cart.

The cart may also be provided with an upper article carrying tray, an upper undercarriage which can be rolled beneath a preloaded tray which can thereafter be secured to the cart, and a lower auxiliary wheeled platform for heavy, low center of gravity loads. All of these attachments can be affixed to and removed from the cart with a minimum of manipulative steps and without the use of tools.

BRIEF DESCRIPTION OF THE DRAWINGS

FIG. 15 is a fragmentary perspective view of the cart of the present invention with its auxiliary rear wheel assembly latched in its stowed position.

FIG. 16 is a perspective view of the cart of the present invention, inclusive of the auxiliary rear wheel assembly, in its fully collapsed condition for carrying or storage.

FIG. 23 is a fragmentary perspective view of the cart of the present invention, provided with an auxiliary platform for use with a heavy load having a low center of gravity.

DETAILED DESCRIPTION OF THE INVENTION

Figure 1:
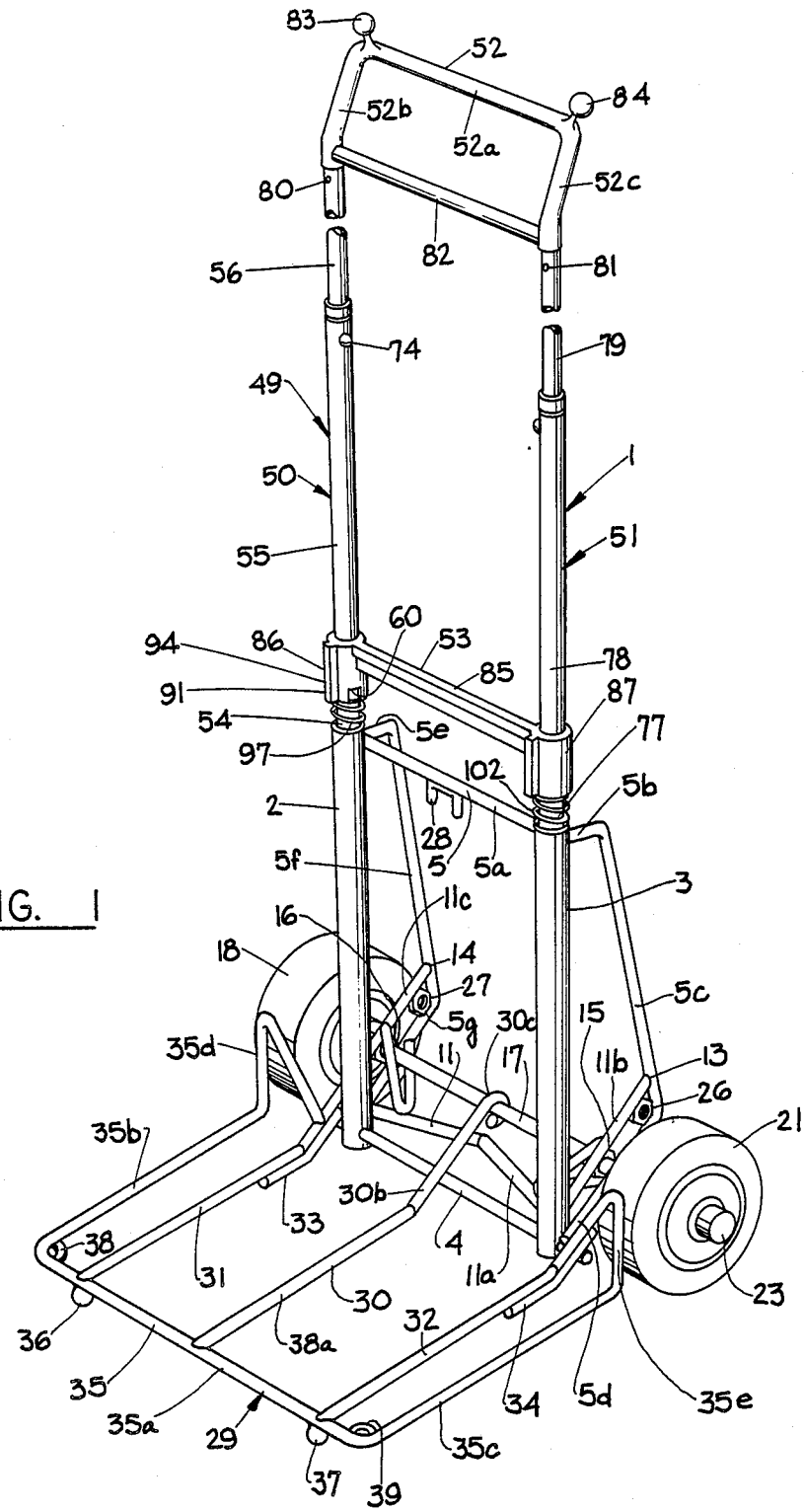
FIG. 1 is a fragmentary perspective view of the cart of the present invention in its simplest form and with its telescoping handle assembly in its fully extended position.

The equipment carrying cart of the present invention is shown in its simplest form in FIG. 1. The cart is generally indicated at 1. The main frame of the cart comprises a pair of upright tubular members 2 and 3 maintained in parallel spaced relationship by transverse brace 4 near their lower ends and by transverse brace 5 near their upper ends. The lower transverse brace 4 comprises a rod-like member which extends through coaxial perforations near the lower ends of main frame tubular members 2 and 3. The lower transverse brace 4 is held in place with respect to the main frame tubular members 2 and 3 by an upset formed at one end of brace 4 and a spring clip at the other end thereof (see FIG. 2).

Figure 2:
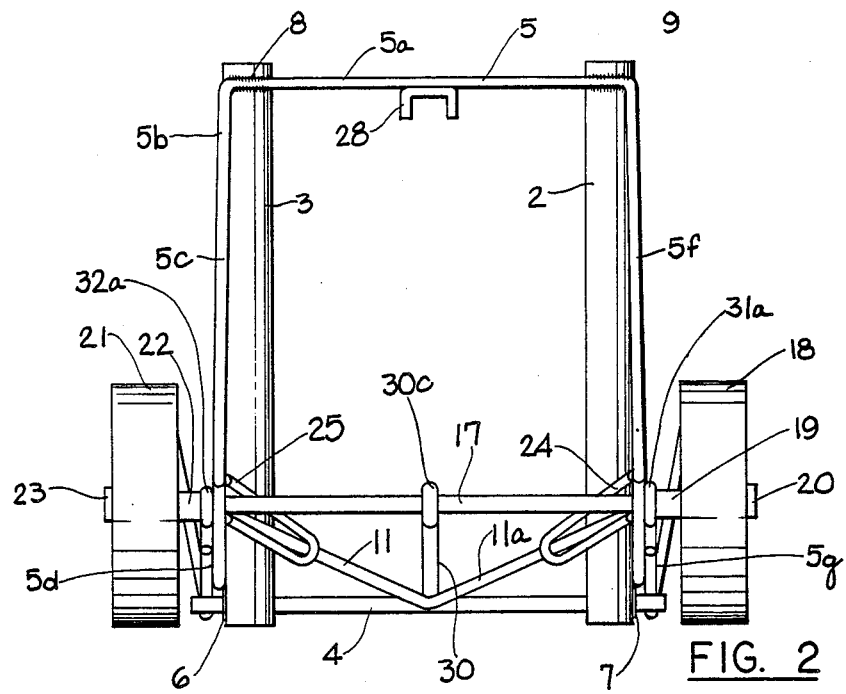
FIG. 2 is a rear elevational view of the main frame of the cart of FIG. 1, with the main wheels in place.
Figure 3:
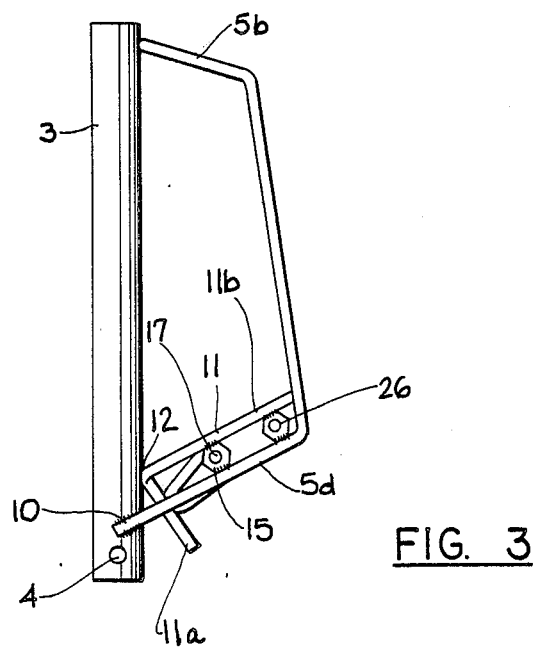
FIG. 3 is a side elevational view of the structure of FIG. 2 with the wheels and lower platform removed.

The upper rod-like transverse brace 5 has a first rectalinear portion 5a which extends from tubular member 2 to tubular member 3 and is welded to the rear surfaces of these tubular members, near their upper ends, as at 8 and 9 (see FIG. 2). As is best seen in FIGS. 1 and 3, the transverse portion 5a of upper brace 5 terminates in a rearwardly and downwardly sloping portion 5d. The portion 5b terminates in another rearwardly and downwardly sloping portion 5c. Finally, the portion 5c terminates in a downwardly and forwardly extending portion 5d. The end of portion 5d lies adjacent tubular member 3, just above lower transverse brace 4, and is welded to tubular member 3, as at 10 (see FIG. 3).

The other end of the transverse portion 5a of upper brace 5 terminates in portions 5e, 5f, and 5g, equivalent to portions 5b, 5c and 5d, respectively. The end of portion 5g (not shown) is welded to main frame tubular member 2 in the same manner as is shown at 10 with respect to portion 5d in FIG. 3.

A third rod-like, transverse brace is illustrated in FIGS. 1 through 3 at 11. Transverse brace 11 has an M-shape. To this end, transverse brace 11 has a central V-shaped portion 11a, terminating in leg portions 11b and 11c. As is most clearly shown in FIGS. 2 and 3, the central V-shaped portion 11a slopes rearwardly and downwardly. The leg portions 11b and 11c of transverse brace 11 extend upwardly and rearwardly, being coplanar with and parallel to the portions 5d and 5g of transverse brace 5. The juncture of V-shaped portion 11a and leg portion 11b is welded to the rear surface of main frame tubular member 3, as at 12 (see FIG. 3). In a similar fashion, the juncture of V-shaped portion 11a and leg portion 11c is welded (not shown) to the rearward surface of main frame tubular member 2. The free ends of leg portions 11b and 11c of transverse brace 11 are welded to portions 5c and 5f of transverse brace 5, as at 13 and 14 (see FIG. 1).

As is best seen in FIG. 3, a hex nut 15 is welded to portion 5d of transverse brace 5 and leg portion 11b of transverse brace 11. Similarly, a hex nut 16 (see FIG. 1) is welded between portion 5g of transverse brace 5 and leg portion 11c of transverse brace 11. A rod-like member 17 extends through hex nuts 15 and 16 and is welded thereto. The rod-like element 17 comprises the axle of cart 1. A wheel 18 is rotatively mounted on one of the ends of axle 17 and is held in place thereon between a spacer 19 and a cap nut 20 which frictionally engages the end of axle 17. Similarly, a wheel 21 is rotatively mounted on the other end of axle 17 and is held in place thereon by a spacer 22 and a cap nut 23 which frictionally engages that end of axle 17.

For additional strength, a U-shaped member 24 has its base portion welded to the V-shaped portion 11a of transverse brace 11 and the free ends of its legs welded to leg portion 11c of transverse brace 11 and portion 5g of transverse brace 5. A similar U-shaped additional brace is shown at 25 with its base portion welded to V-shaped portion 11a of transverse brace 11 and the free ends of its leg portions welded to leg portion 11b of transverse brace 11 and portion 5d of transverse brace 5, respectively.

Returning to FIG. 3, a second hex nut 26 is welded to leg portion 11b of transverse brace 11 and portions 5c and 5d of transverse brace 5. Similarly, an additional hex nut 27 is welded to leg portion 11c of transverse brace 11 and portions 5f and 5g of transverse brace 5. The purpose of hex nuts 26 and 27 will be apparent hereinafter.

The main frame portion of cart 1 is completed by the provision of an inverted U-shaped member 28 welded to and centrally of transverse portion 5a of transverse brace 5. The purpose of inverted U-shaped member 28 will be explained hereinafter. It will be understood by one skilled in the art that the portions 5c and 5f of transverse brace 5 will act as skids or slides, assisting in moving cart 1 up or down stairs, curbs or the like.

The cart 1 is provided with a load supporting platform, generally indicated at 29. Platform 29 is shiftable between a load supporting position shown in FIG. 1 and a storage position shown in FIG. 10. Platform 29 comprises three substantially identical rod-like members 30, 31 and 32. Member 30 has a first portion 30a which is substantially horizontal when the cart 1 is upright and the platform 29 is in its load supporting position, as shown in FIG. 1. Member 30 has a second portion 30b which slopes upwardly and rearwardly from portion 30a. Portion 30b terminates in a closed hook-like portion 30c. The closed hook-like portion 30c extends about axle 17. As a consequence, member 30 is captively and rotatively mounted on axle 17. Member 31 is substantially identical to member 30 having a closed hook-like portion 31a captively mounted on axle 17 (see FIG. 2). It will be noted from FIG. 2 that the closed hook-like portion 31b is located between hex nut 16 (not shown in FIG. 2) and spacer 19. Member 31 differs from member 30 primarily in that it has a rod-like element 33 welded thereto for additional strength. Member 32 is identical to member 31, having a closed hook-like portion 32a captively mounted on axle 17. As will be apparent from FIG. 2, the closed hook-like portion 32a is located between hex nut 15 (now shown) and spacer 22. Member 32 has a rod-like element 34 welded thereto for additional strength Platform 29 is completed by a rod-like peripheral member 35 having a forward portion 35a, and side portions 35d and 35c. It will be apparent from FIG. 1 that the three forward ends of members 30, 31, and 32 are welded to the forward portion 35a of peripheral member 35. The side portion 35b terminates in an inverted V-shaped portion 35d, the end of which is welded to member 31. Similarly, side portion 35c of peripheral member 35 terminates in an inverted V-shaped portion 35e, the free end of which is welded to member 32. The inverted V-shaped portions 35d and 35e act as fenders for wheels 18 and 21, preventing a load supported on platform 29 from contacting or being rubbed by wheels 18 and 21.

At the juncture of portion 35a of peripheral member 35 and members 31 and 32 there is welded to peripheral member portion 35a a pair of spherical metallic feet 36 and 37. When cart 1 is in its upright position with platform 35 in its load-carrying position, the surface supporting the cart is contacted by wheels 18 and 21, the lower ends of main frame tubular members 2 and 3 and platform feet 36 and 37.

Figure 13:
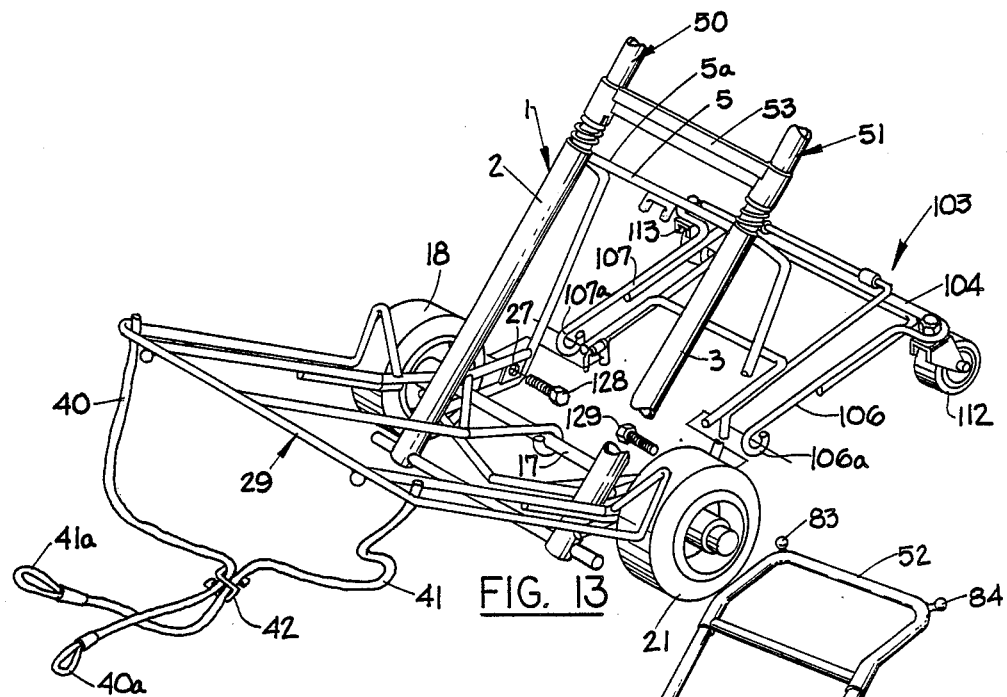
FIG. 13 is a fragmentary, perspective, exploded view illustrating the cart and the auxiliary rear wheel assembly.

At the junctures of the forward portion 35a of peripheral member 35 and its side portions 35d and 35c there are welded a pair of rings 38 and 39. Rings 38 and 39 comprise anchors for elastic security cords. The elastic security cords are not shown in FIG. 1 for purposes of clarity, but are illustrated in FIG. 13 at 40 and 41. The free ends of elastic security cords 40 and 41 terminate in loops 40a and 41a. The elastic security cords 40 and 41 pass through a S-shaped buckle 42. The manner in which security cords 40 and 41 are used will be described hereinafter.

Finally, platform 29 is provided with a latch to lock it in its load-carrying position, to render platform 29 secure and to permit use of security cords 40 and 41.

Figures 17, 18:
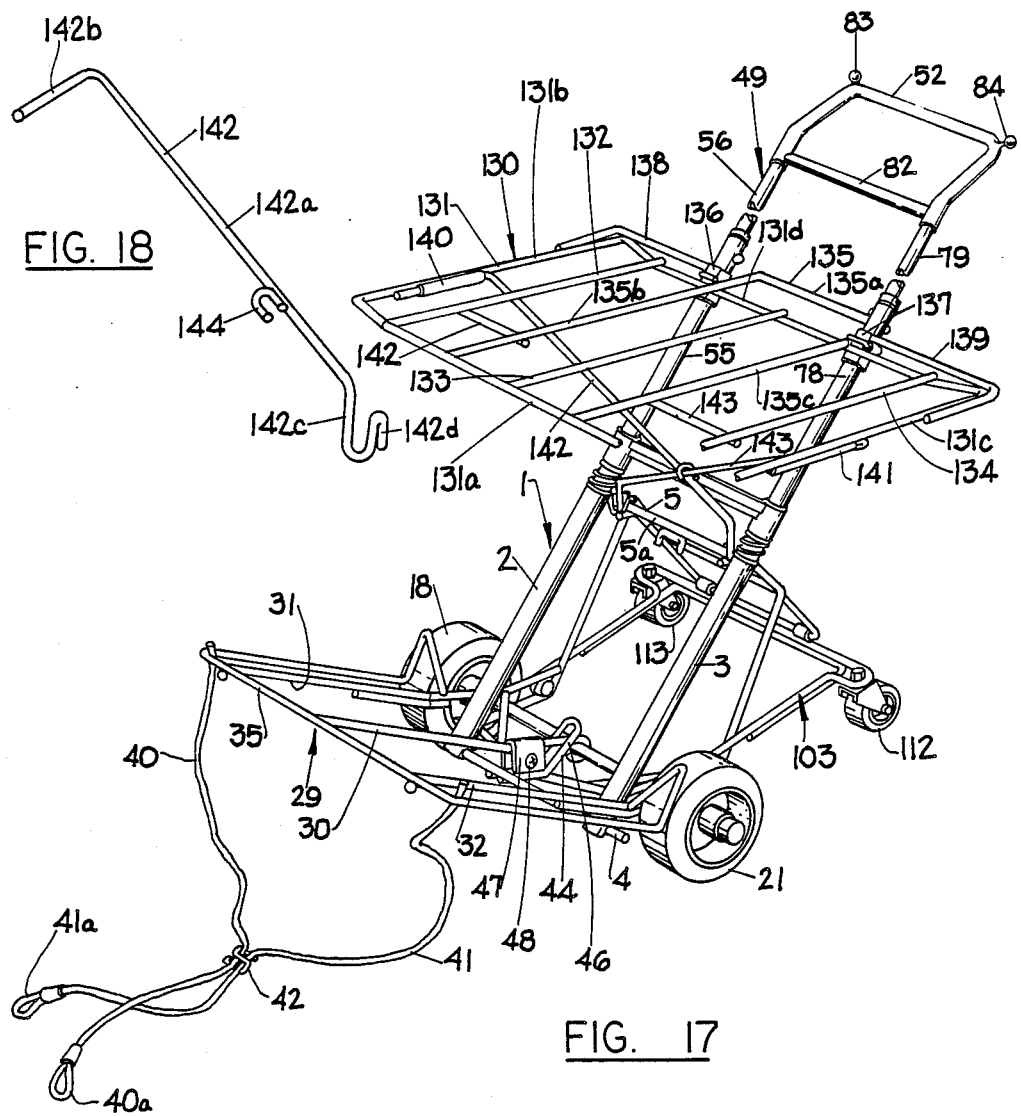
FIG. 17 is a fragmentary perspective view of the cart of the present invention provided with its auxiliary rear wheel assembly and an upper tray assembly.
FIG. 18 is a perspective view of one of the struts supporting the upper tray of FIG. 17.

For purposes of clarity, the latch has been eliminated from all of the figures except FIG. 17. It will nevertheless be understood that the latch for platform 29 is an important element of the cart. While any appropriate latch mechanism can be used, an exemplary embodiment is generally indicated at 43 in FIG. 17. The latch comprises a U-shaped rod-like member 44 having legs 45 and 46 which lie to either side of platform member 30. The legs 45 and 46 of U-shaped member 44 are joined together by an inverted U-shaped strap 47 which is rendered captive on platform member 30 by bolt 48.

The load-carrying position of platform 29 is defined by contact of lower transverse brace member 4 by the platform elements 30, 33 and 34. When platform 29 is in its load-carrying position, the latch element 43 can be shoved forwardly so that the free ends of its legs 45 and 46 engage beneath lower transverse brace 4, locking the platform in its load-carrying position. To release the platform from its load-carrying position, it is only necessary to shift latch 43 rearwardly, until the free ends of its legs 45 and 46 no longer engage beneath transverse brace member 4.

The main frame assembly just described is provided with a telescoping handle assembly next to be described and generally indicated at 49. The telescoping handle assembly 49 comprises first and second telescoping tubular assemblies generally indicated at 50 and 51. The uppermost ends of the telescoping tubular assemblies 50 and 51 are connected by a grip 52. Handle assembly 49 is completed by a release bar 53.

Tubular assembly 50 is made up of three tubular members 54, 55 and 56. Tubular member 54 has an outside diameter such that it is receivable in main frame tubular member 2 with a sliding fit. Tubular member 54 is anchored in main frame tubular member 2. This is accomplished by providing the lower end of tubular member 54 with a pair of coaxial holes through which the lower transverse brace 4 extends. Tubular member 54 is slightly longer than main frame tubular member 2, as can be seen in FIG. 6.

Figure 10:
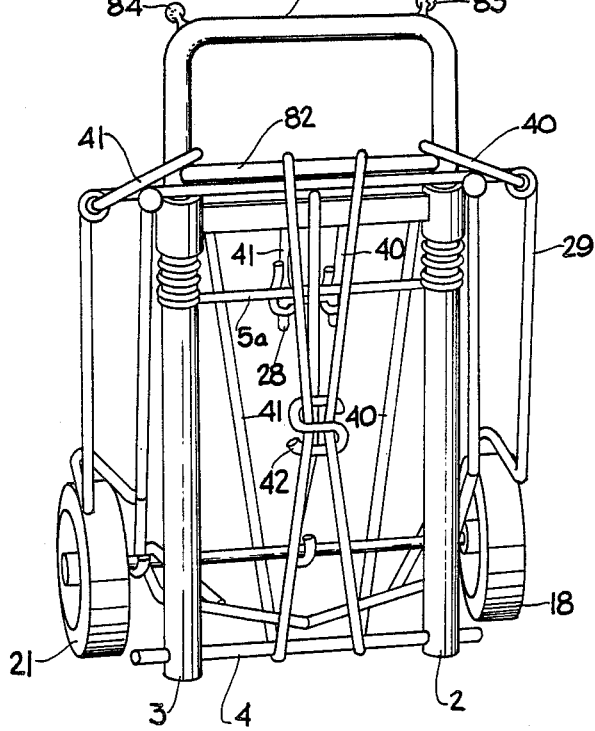
FIG. 10 is a perspective view illustrating the cart of FIG. 1 in its fully collapsed position to be carried or stored.

Tubular member 55 has an outside diameter such that it is telescopically received in tubular member 54. Tubular member 55 is shiftable axially between an extended position wherein the majority of tubular member 55 is outside of tubular member 54 (see FIG. 1), and a retracted position wherein the majority of tubular member 55 is within tubular member 54, as shown in FIG. 10. Finally, tubular member 56 has an outside diameter such that it is telescopically receivable within tubular member 55 and is axially shiftable with respect thereto between an extended position wherein the majority of its length extends outside tubular member 55 (see FIG. 1), and a retracted position wherein the majority of its length is within tubular member 55 (see FIG. 10).

Figure 6:
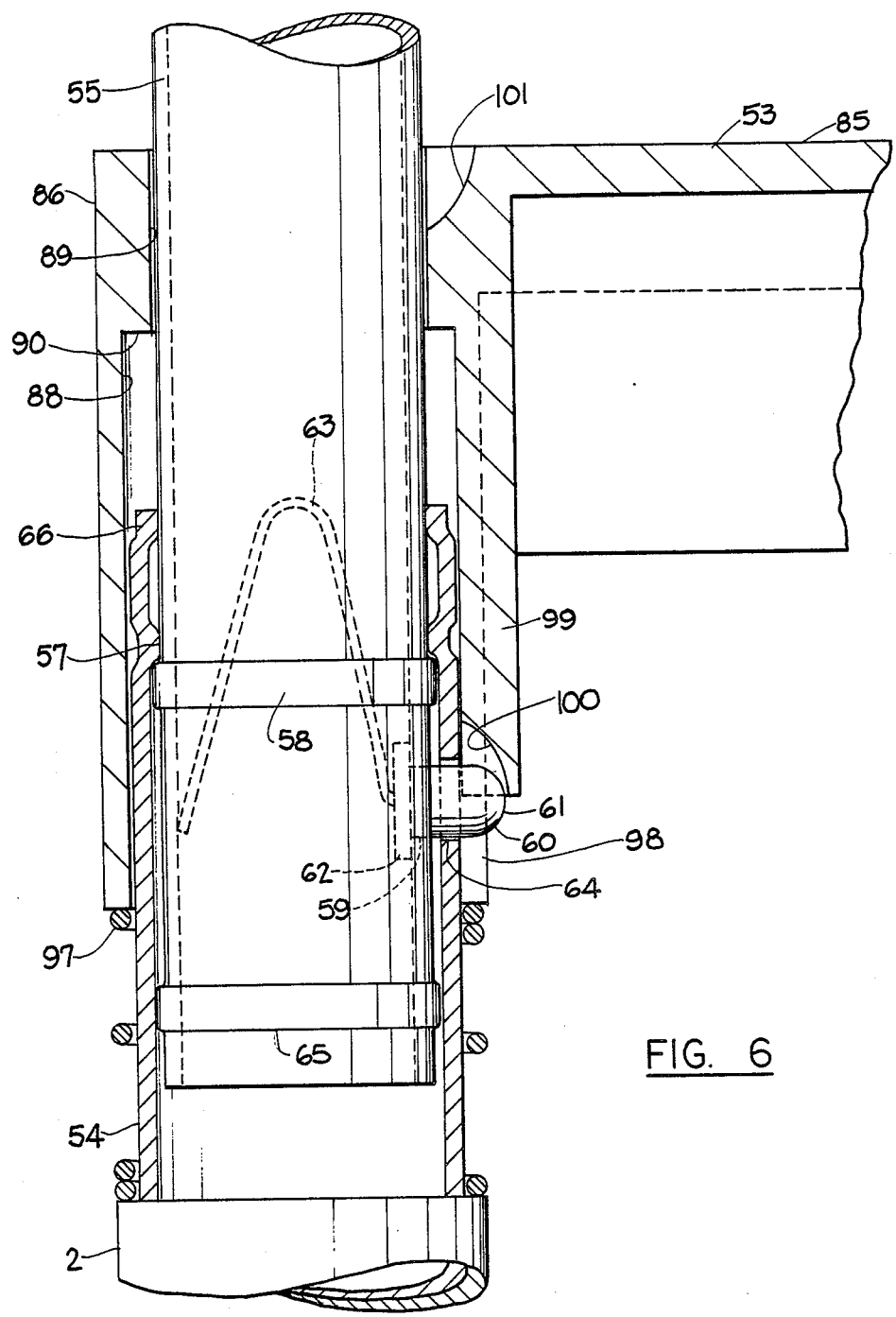
FIG. 6 is a fragmentary cross sectional view taken along section line 6—6 of FIG. 4.

Referring to FIG. 6, tubular member 55 is illustrated in its extended position with respect to tubular member 54. Near its upper end, tubular member 54 has an internal annular rib 57. Near its lower end, tubular member 55 has an external annular rib 58. Ribs 57 and 58 cooperate to render tubular member 55 captive within tubular member 54.

Tubular member 55, near its lower end, is provided with a perforation 59. Mounted in perforation 59 there is a detent 60 terminating at one end in a rounded nose 61 and at the other end in an annular flange 62. Annular flange 62 is of a greater diameter than perforation 59. Detent 60 is affixed to one end of an inverted V-shaped spring 63 which constantly urges the detent to a fully seated position in perforation 59. When tubular member 55 is in its telescoped condition with respect to tubular member 54, detent 60 will be maintained in a retracted position in perforation 59 by the inside surface of tubular member 54. Near its upper end, tubular member 54 is provided with a perforation 64. When tubular member 55 is shifted axially to its fully extended position, its perforation 59 is aligned with the perforation 64 of tubular member 54 and spring 63 urges detent 60 through both perforations, thereby locking tubular member 55 with respect to tubular member 54 in its extended position. It will be noted that the lower end of tubular member 55 has a second annular rib 65 which serves simply to stabilize tubular member 55 within tubular member 54. Similarly, the uppermost end of tubular member 54 is provided with an annular rib 66, serving the same stabilizing purpose. The extended position of tubular member 55 with respect to tubular member 54 is determined by the abutment of rib 57 of tubular member 54 by the rib 58 of tubular member 55. The retracted position of tubular member 55, with respect to tubular member 54, is determined by the abutment of the lowermost end of tubular member 55 against the lower transverse brace 4.

Figure 8:
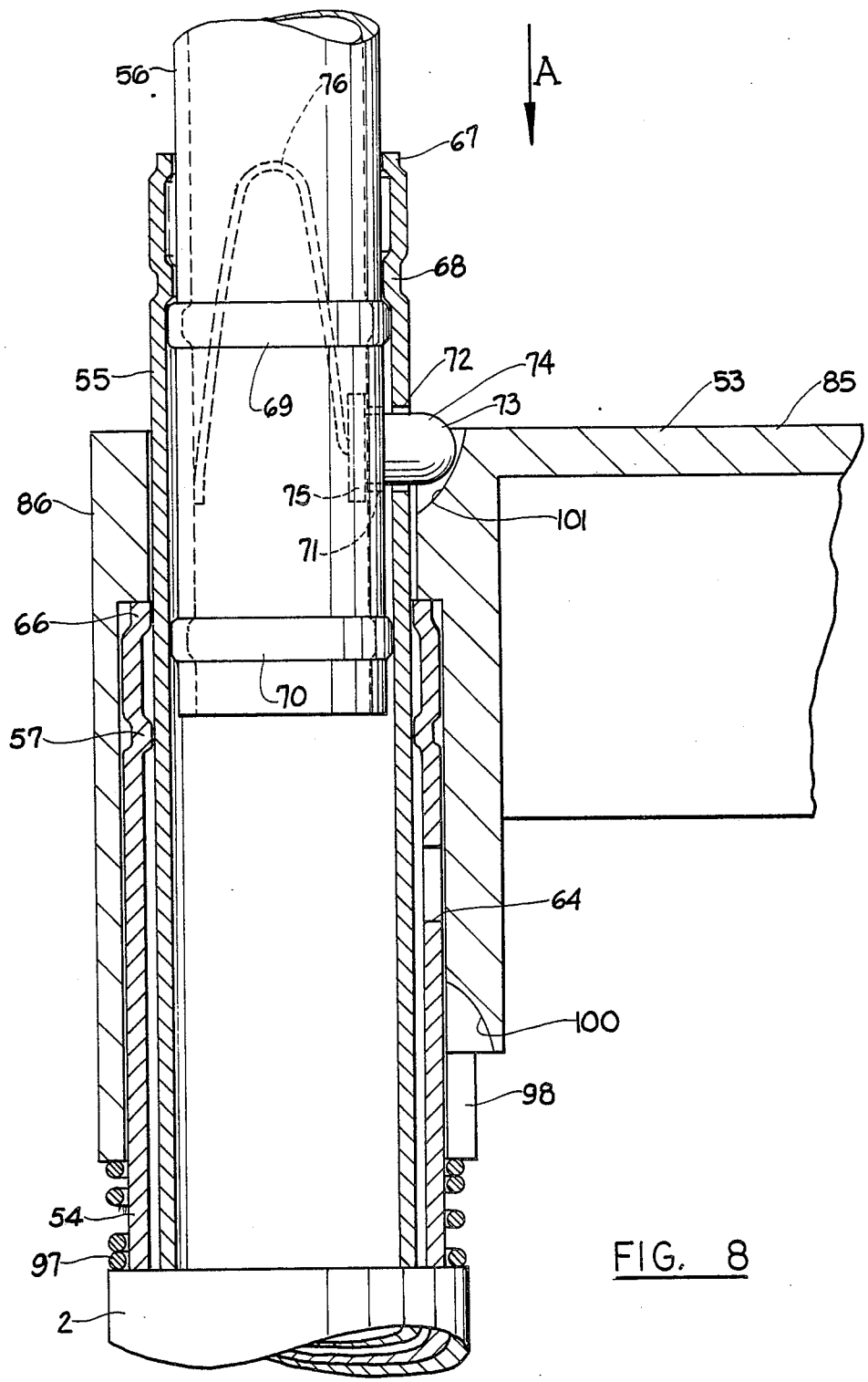

Reference is now made to FIG. 8. In FIG. 8, the uppermost end of tubular member 55 and the lower end of tubular member 56 are shown. It will be noted that the upper end of tubular member 55 is provided with inner annular ribs 67 and 68 equivalent to the inner annular ribs 66 and 57 of tubular member 54 (see FIG. 6). Similarly, the lower end of tubular member 56 is provided with outer annular ribs 69 and 70, equivalent to outer annular ribs 58 and 65 of tubular member 55. Inner annular rib 67 and outer annular rib 70 serve as stabilizing members. Inner annular rib 68 is abutted by outer annular rib 69 to determine the extended position of tubular member 56.

It will be noted from FIG. 8 that the lower end of tubular member 56 is provided with a perforation 71. The upper end of tubular member 55 is provided with a similar perforation 72, which is coaxial with perforation 71 when tubular member 56 is in its extended position. Perforations 71 and 72 are adapted to receive a locking detent 73, similar to locking detent 60 of FIG. 6, and having a rounded nose 74 and a flange portion 75. The detent 73 is provided with an inverted U-shaped spring 76 which urges the detent to its locking position, when tubular member 56 is in its extended position. When detent 73 is in its unlocking position, as will be described hereinafter, its nose portion 74 will simply contact the inside surface of tubular member 55.

Returning to FIG. 1, it will be understood that the telescoping tubular assembly 51 is substantially identical to and is a mirror image of telescoping tubular assembly 50, being made up of tubular members 77, 78 and 79. Tubular member 77 is equivalent to tubular member 54. Tubular member 78 is equivalent to tubular member 55. Finally, tubular member 79 is equivalent to tubular member 56.

Tubular member 77 is provided at its upper end with a pair of inner, annular ribs (not shown) equivalent to inner annular ribs 66 and 57 of tubular member 54 (see FIG. 6). Tubular member 77 will also be provided with a perforation equivalent perforation 64 of tubular member 54. Tubular member 78 will have near its lower end a pair of external ribs equivalent to ribs 58 and 65 of tubular member 55, as well as a perforation (not shown) equivalent to perforation 59 in tubular member 55. The upper end of tubular member 78 will be provided with a pair of inner, annular ribs (not shown) equivalent to ribs 67 and 68 of tubular member 55 (see FIG. 8), together with a perforation (not shown) equivalent to perforation 72 of tubular member 55. Finally, tubular member 78 will be provided with a spring biased detent (not shown) equivalent to spring biased detent 60 of tubular member 55 (see FIG. 6). Tubular member 79 is provided at its lower end with external annular ribs (not shown) equivalent to annular ribs 69 and 70 of tubular member 56 (see FIG. 8), together with a perforation (not shown) equivalent to perforation 71 of tubular member 56. Finally, tubular member 79 will be provided with a spring biased detent (not shown) equivalent to spring biased detent 73 of tubular member 56 (see FIG. 8).

As indicated above, and as illustrated in FIG. 1, the upper ends of tubular members 56 and 79 are joined together by a grip 52. The grip 52 comprises an inverted U-shaped member having a base portion 52a and downwardly depending leg portions 52b and 52c. The free ends of leg portions 52b and 52c are of such diameter as to be receivable within the upper ends of tubular members 56 and 79 and are fixed therein in any appropriate way, such as by rivets 80 and 81. Grip 52 is provided with a transverse member 82, both for strength and to provide an additional gripping surface. Grip 52 is completed by the provision of a pair of rounded cleats 83 and 84, located at the uppermost corners thereof. The purpose of cleats 83 and 84 will be apparent hereinafter. While grip 52 may be made of metal, it lends itself well to being molded of a plastic material characterized by adequate strength. Preferably, grip 52 is provided with an anti-slip surface which may constitute an appropriate coating when grip 52 is made of metal, or which may constitute a textured surface, if grip 52 is molded of plastic or the like.

In order to shift telescoping handle assembly 49 to its fully extended position as shown in FIG. 1, it is only necessary for the cart operator to pull upwardly on grip 52. Tubular member 55 will shift axially with respect to tubular member 54 to its extended position shown in FIG. 6, wherein it will be locked by detent 60. Similarly, tubular member 56 will shift axially to its extended position with respect to tubular member 55, in which position it will be locked by spring biased detent 73, as shown in FIG. 8. Similarly, tubular members 78 and 79 will also be shifted to their extended positions and will be locked therein by their respective spring biased detents (not shown).

To return the telescoping handle assembly 49 to its retracted position, it is necessary for the operator to shove downwardly on grip 52 and to shift the spring detents of tubular members 55 and 78 and tubular members 56 and 79 to their unlocking positions. To this end, the cart 1 is provided with a single release bar 53, known per se.

The release bar 53 may be made of any appropriate material such as metal. It lends itself well, however, to be molded of plastic material of appropriate strength. The release bar 53 has an elongated body portion 85 which extends transversely between the telescoping tubular assemblies 50 and 51. The body portion 85 terminates at each end in sockets 86 and 87. The socket 87 is a mirror image of the socket 86. Therefore, it is believed that a description of socket 86 and the manner in which it cooperates with tubular members 54, 55 and 56 will serve also as a description of socket 87 and the identical manner in which it cooperates with tubular members 77, 78 and 79.

Figure 4:
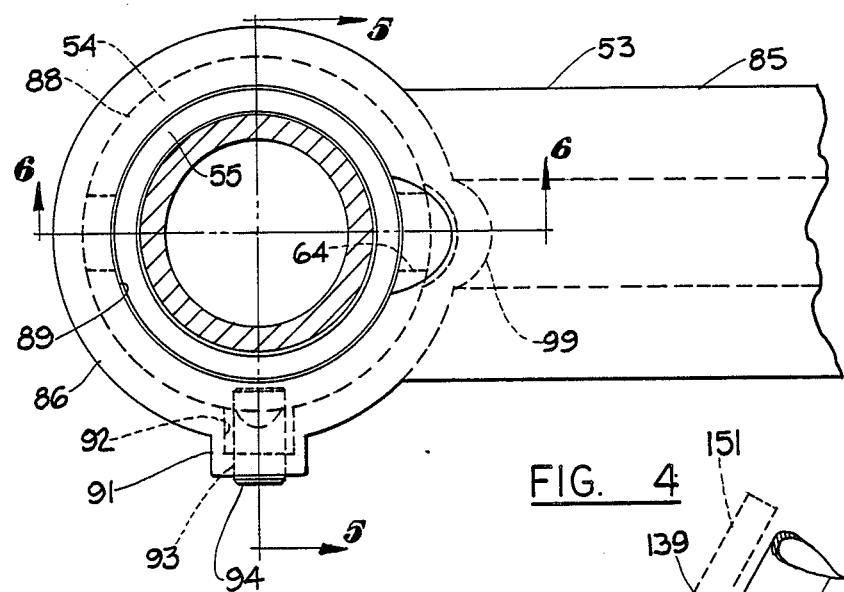
FIG. 4 is a fragmentary plan view of the release bar of the present invention.
Figure 5:
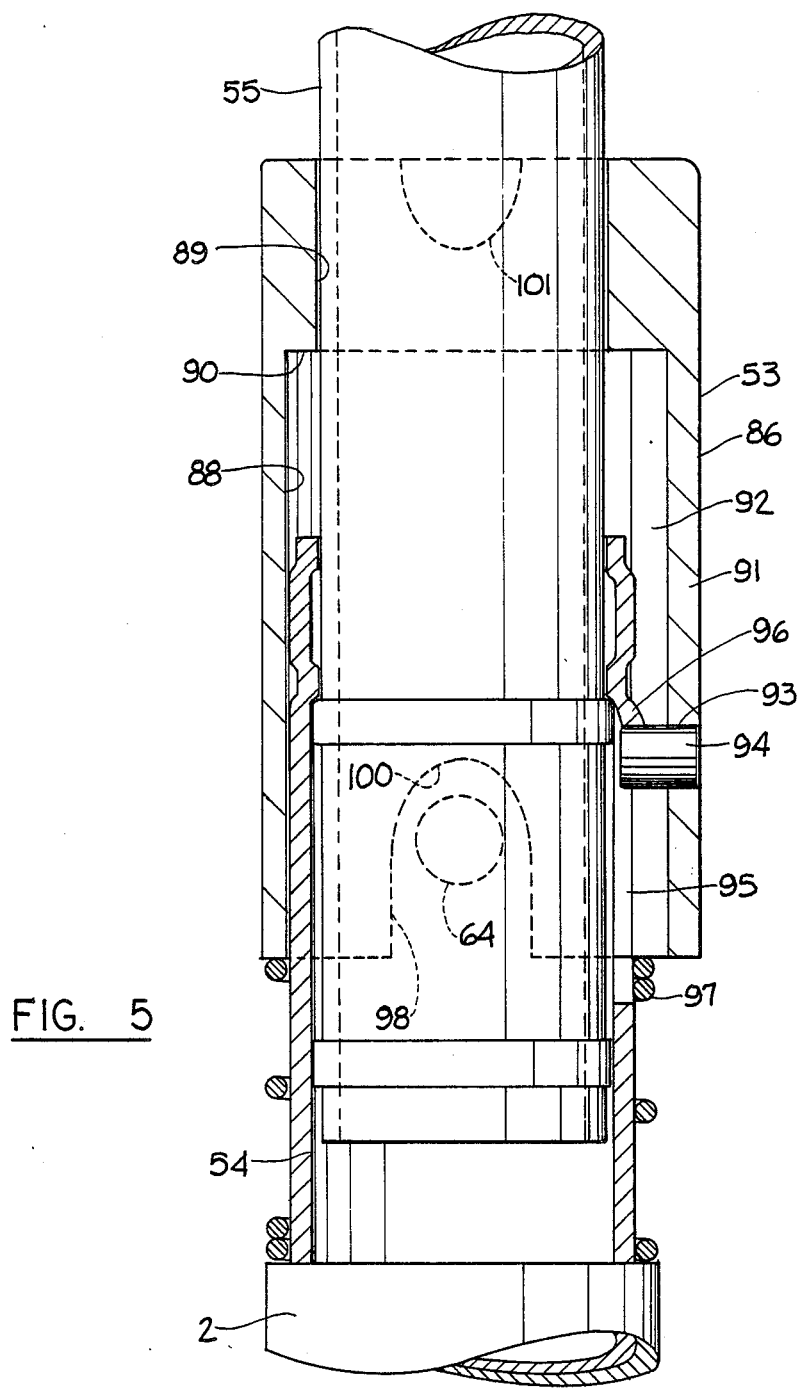
FIG. 5 is a fragmentary cross sectional view taken along section line 5—5 of FIG. 4.

Reference is now made to FIGS. 4, 5 and 6. Socket 86 comprises an integral, one-piece part of main body portion 85 of release bar 53. Socket 86 is generally cylindrical in configuration and has a central bore comprising a first bore portion 88 of a diameter to slidingly receive the upper end of tubular member 54, and a second bore portion 89 of a smaller diameter to slidingly receive tubular member 55. An annular shoulder 90 is formed between bore portions 88 and 89.

That portion of socket 86 which faces forwardly of the cart 1 is provided with a vertical boss 91 which extends the length thereof (see also FIG. 1). As can most clearly be seen in FIGS. 4 and 5, the vertical boss 91 enables the formation of a vertical interior slot 92. The boss 91 has a perforation 93 formed therein, adapted to mount a guide pin 94.

That portion of tubular member 54 which faces forwardly of cart 1 is provided with a longitudinal slot 95. At the upper end of slot 95, the metal of tubular member 54 is slightly upset to form a lip 96 which is accommodated by socket slot 92.

It will be noted from FIG. 5 that the socket 86 is mounted on the upper end of tubular member 54 and is shiftable axially with respect thereto. Guide pin 94 extends into the slot 95 of tubular member 54 and determines the upper and lower limits between which socket 86 can be axially shifted with respect to tubular member 54. The slot 95 of tubular member 54 is located about 90° from the perforation 64 in tubular member 54 (see also FIG. 6). The perforation 64 is shown in FIG. 5 in broken lines. Socket 86 is biased to its uppermost position, determined by abutment of pin 94 against lip 96, by a compression spring 97.

As opposed to previously known carts having a single release bar, the embodiment shown differs in that the axial length of sockets 86 and 87 has been shortened. This, in conjunction with the presence of main frame tubes 2 and 3, enables the provision of compression springs 97 and 102. These springs abut their respective ones of sockets 86 and 87 and their respective ones of main frame tubes 2 and 3, urging release bar 53 to its uppermost normal position. The advantage of this will be apparent hereinafter.

FIG. 6, like FIG. 5, shows socket 86 in its uppermost, normal position, and is a view taken along section line 6—6 of FIG. 4. As will be apparent from FIGS. 5 and 6, the lower edge of socket 86 is provided with a notch 98 which accommodates detent 60, when in its locking position. Above the notch 98, the wall of socket 86 is thickened by a vertical boss 99 of arcuate cross section (see also FIG. 4). At its lower end, adjacent notch 98, the boss 99 is provided on its inside surface with an arcuate cam surface 100. At the uppermost end of bore portion 89 of socket 86, the socket is provided with a second, similar arcuate cam surface 101.

The release bar 53 and its socket 86 having been described in detail, the operation of release bar 53 to enable the shifting of telescoping handle assembly 49 to its retracted position can now be described. When handle assembly 49 is in its fully extended position, as shown in FIG. 1, tubular member 55 will be locked in its extended position with respect to tubular member 54 by spring biased detent 60, as shown in FIG. 6. Similarly, tubular member 56 will be locked in its extended position with respect to tubular member 55 by its spring biased detent 74. A downward force on handle assembly 49 will be resisted by spring detents 60 and 74 and the telescoping tubular assembly 50 will remain extended. The same, of course, is true of telescoping tubular assembly 51 which is locked in its extended position by its detents (not shown) equivalent to detents 60 and 74. To lower the handle assembly 49 to its retracted position shown in FIG. 10, it is only necessary to shove release bar 53 downwardly in the direction of arrow A of FIG. 7, against the action of spring 97, to its lowermost position as determined by abutment of pin 94 at the bottom end of slot 95 of tubular member 54 (see FIG. 5). Release bar 53 is shown in its lowermost position in FIG. 7.

Figure 7:
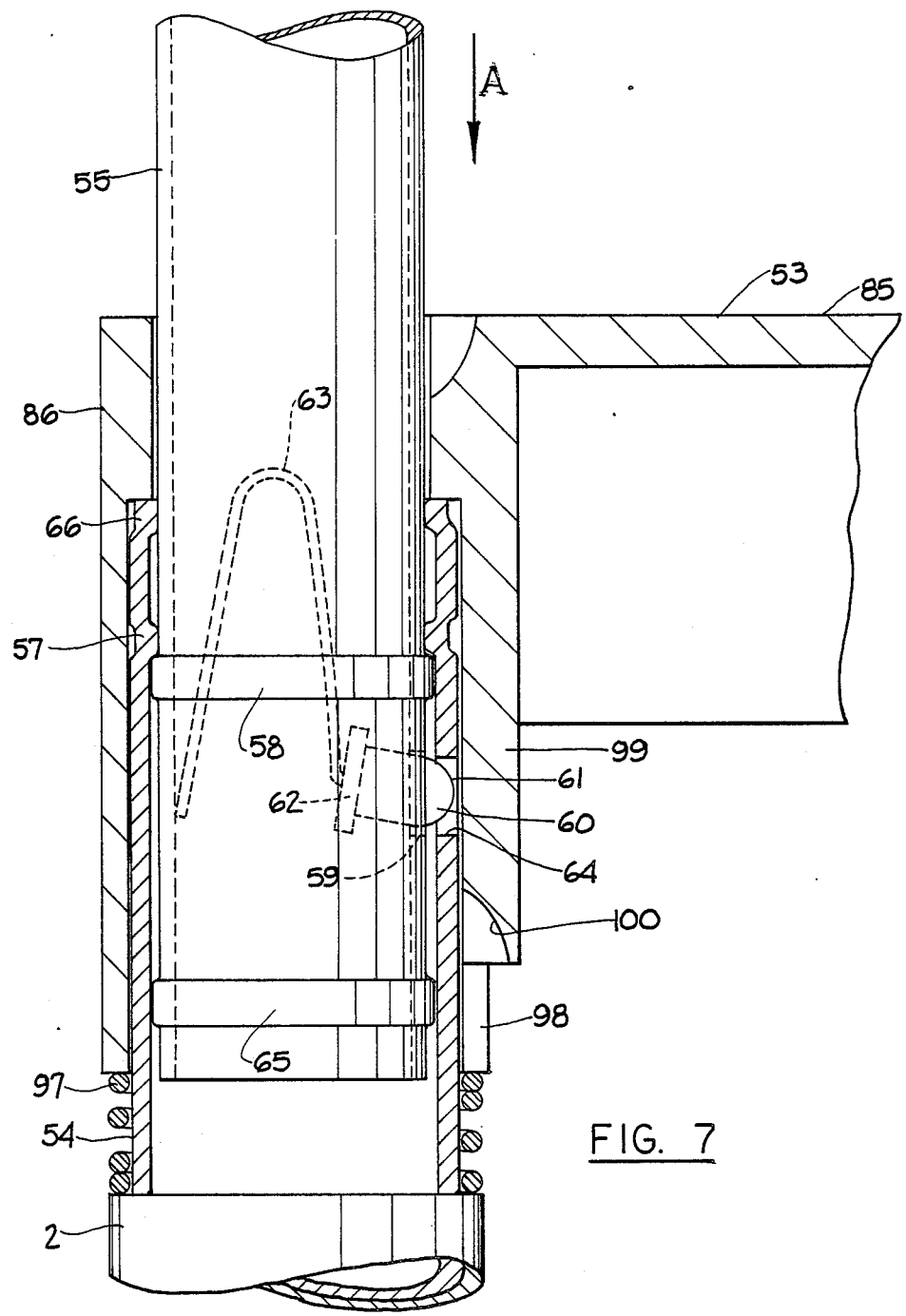
FIGS. 7, 8 and 9 are fragmentary cross sectional views, similar to FIG. 6, and illustrating the release bar in its lower actuated position and the telescoping assembly of the handle assembly in various stages of being shifted to its fully telescoped and retracted position.

It will be apparent from FIG. 7 that cam surface 100 and then the adjacent inside surface of socket 86 has caused spring biased detent 60 to retract to a position wherein the forwardmost portion of its rounded nose 61 is located within the perforation 64 of tubular member 54. Since only the forwardmost portion of rounded nose 61 lies within tubular member perforation 64, a downward force on tubular member 55 in the direction of arrow A will cause the lower edge portion of tubular member perforation 64 to cam spring detent 60 to its fully retracted position, allowing tubular member 55 to be telescoped downwardly within tubular member 54. As the tubular member 55 shifts downwardly within tubular member 54, the rounded nose 61 of spring detent 60 will ride along the inside surface of tubular member 54 and the tubular member can be shifted to its fully retracted position wherein its bottom end abuts lower transverse brace 4 within tubular member 54.

Figure 9:
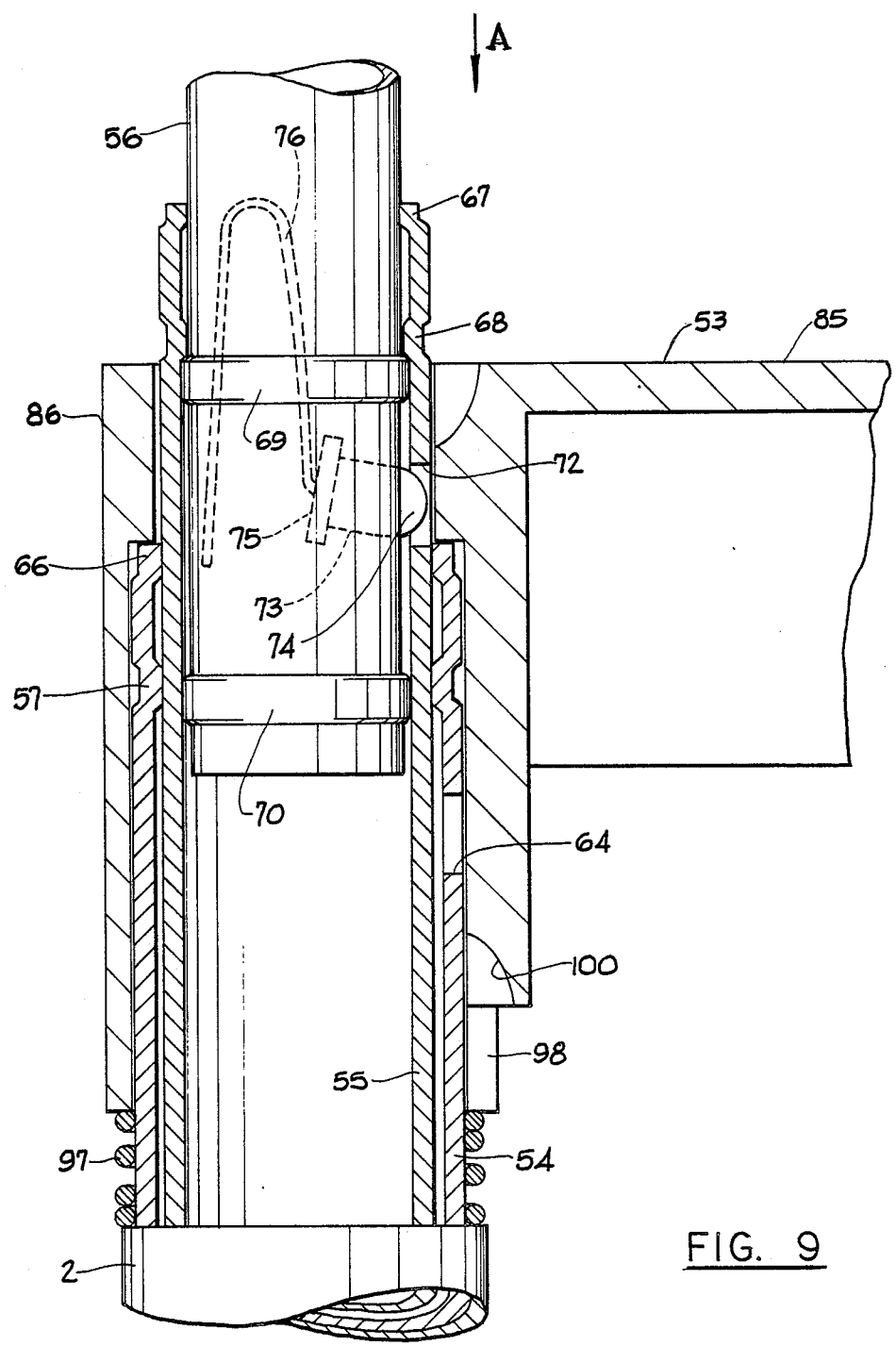

FIG. 8 also shows release bar 53 in its downwardly depressed position against the action of spring 97. FIG. 8 illustrates the positions of the various parts just before tubular member 55 reaches its fully retracted position. It will be noted that spring detent 73 of tubular member 56 has contacted cam surface 101 of release bar 53. Further, downward movement of grip 52 will result in the location of spring detent 73 as shown in FIG. 9. It will be apparent from FIG. 9 that cam surface 101 and the adjacent interior surface of socket 86 has caused spring detent 73 to retract to a position wherein only the forwardmost portion of its rounded nose 74 lies within the perforation 72 of tubular member 55. It will be noted that that portion of the inside surface of socket 86, adjacent cam surface 101, is of a diameter substantially equal to the inside diameter of tubular member 54. Further downward movement in the direction of arrow A will result in the detent 73 being shifted to its fully retracted position by the lower edge of the perforation 72 of tubular member 55. From that point on, the nose 74 of detent 73 will ride on the inside surface of tubular member 55, allowing tubular member 56 to achieve its fully retracted position. When this occurs, the release bar 53, itself, may be released to return to its normal position under the influence of compression spring 97. At this point, the entire handle assembly 49 is in its fully retracted position, as shown in FIG. 10. As indicated above, to return the handle assembly 49 to its fully extended position, it is only necessary to pull upwardly on grip 52 in a direction opposite arrow A. When this occurs, tubular member 56 will shift upwardly within tubular member 55 until detent 74 reaches cam surface 101. At that point, spring detent 73 will pass through perforation 71 in tubular member 56 and perforation 72 in tubular member 55, locking tubular member 56 with respect to tubular member 55. Further upward movement of grip 52 will cause tubular member 55 to shift upwardly with respect to tubular member 54 until it reaches the point illustrated in FIG. 6, wherein tubular member 55 will be locked with respect to tubular member 54 by spring detent 60, as shown in FIG. 6. During shifting of the handle assembly 49 to its fully extended position, release bar 53 remains in its normal upper position shown in FIGS. 1 and 6. The fact that compression springs 97 and 102 bias release bar 53 to its normal uppermost position assures that, when handle assembly 49 is shifted to its fully extended position, it will be locked and ready for use. It is not necessary for the operator to have to remember to manually shift release bar 53 to its normal position.

As indicated above, tubular members 77, 78 and 79 of tubular assembly 51 cooperate with socket 87 of release bar 53 and its compression spring 102 in precisely the same manner described with respect to tubular assembly 50 and socket 86. It will be apparent from the above description that when the handle assembly 49 is in its fully extended position, the various parts thereof will be locked with respect to each other. To shift handle assembly 49 to its downward position, it is only necessary to depress release bar 53 against the action of compression springs 97 and 102 and to shove downwardly on grip 52. While release bar 53 can be depressed manually, it is often most convenient for the cart operator to depress it with his or her foot. Thus, telescoping handle assembly 49 is extremely simple, easy and convenient to operate.

To store or carry the cart assembly in its fully retracted position, as shown in FIG. 10, platform 29 is raised to its stowed position adjacent main frame tubular members 2 and 3. Security cords 40 and 41 are brought around and through grip 52 between its handle portion 52a and its transverse member portion 82. Thereafter, security cords 40 and 41 are stretched downwardly along the back of the cart, about lower transverse brace member 4, and then upwardly along platform 29 and over grip transverse member 82, causing the security cord loops 40a and 41a to be engaged on the downwardly depending leg members of U-shaped cleat 28 affixed to upper transverse brace member portion 5a. In the condition shown in FIG. 10, the cart assembly can be easily carried or stored.

When the cart 1, in its simplest form as shown in FIG. 1, is to be used, the platform 29 is lowered to its load-carrying position and is locked therein as described above. The load is placed upon the platform and the security cords are raised over the load and their looped ends 40a and 41a are engaged on grip cleats 83 and 84. This arrangement eliminates the use of hook-like elements at the ends of security cords 40 and 41. Such hook-like elements can be dangerous if they slip out of the operator's hand during stretching of the security cords, or should they become unhooked during use of the cart. If the load mounted on platform 29 is small, the security cords can be located over the load and under upper horizontal brace portion 5a, to cleats 83 and 84. Security cord buckle 82 can be adjusted to best secure the load.

When the cart 1 is intended to carry a load having a high center of gravity, the cart may be provided with an auxiliary rear wheel assembly. Reference is made to FIGS. 11 through 14 wherein the auxiliary rear wheel assembly is generally indicated at 103.

Figure 11:
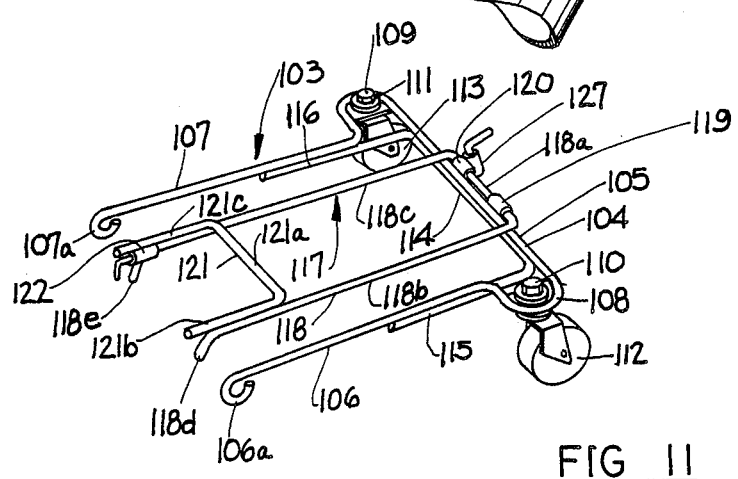
FIG. 11 is a perspective view of the auxiliary rear wheel assembly of the present invention.

Turning first to FIG. 11, the auxiliary rear wheel assembly 103 includes a base frame element 104 of generally U-shaped configuration. The base frame element 104 comprises a base portion 105 and a pair of forwardly extending leg portions 106 and 107. The free ends of leg portions 106 and 107 terminate in loops 106a and 107a, respectively. At the juncture of base Portion 105 and leg portions 106 and 107 looped portions 108 and 109 are formed in base frame element 104. The looped elements 108 and 109 have welded thereto mounting brackets 110 and 111 to which casters 112 and 113, respectively, are attached. Preferably, casters 112 and 113 are replaceable and are attached to their respective mounting brackets 110 and 111 by bolts. The casters 112 and 113, if desired may be of the lockable type. The base frame element 104 is completed by the addition of a rod-like wire element 114 welded to base portion 104 for additional strength. If desired, the reinforcing element 114 may be of a U-shaped configuration, having leg portions 115 and 116 welded to leg portions 106 and 107, respectively.

The base frame element 104 has pivotally attached thereto a strut assembly generally indicated at 117. The strut assembly 117 comprises a U-shaped rod-like member 118 having a base portion 118a and forwardly extending leg portions 118b and 118c. As will be noted in FIG. 11, the free ends of legs 118b and 118c terminate in downturned portions 118d and 118e, respectively. The base portion 118a passes through a pair of tubular members 119 and 120 welded to the base portion 105 of base frame element 104. In this way, the strut assembly 117 is pivotally affixed to base frame element 104.

The strut assembly 117 includes a second rod-like U-shaped element 121 comprising a base portion 121a and a pair of forwardly extending legs 121b and 121c. The legs 121b and 121c are welded to leg portions 118b and 118c, respectively, of the strut assembly. As can be ascertained from FIG. 11, the free ends of strut assembly legs 121b and 121c, together with the downturned free ends 118d and 118e of strut assembly member 118 form V-shaped notches, the purpose of which will be described hereinafter.

Figure 12:
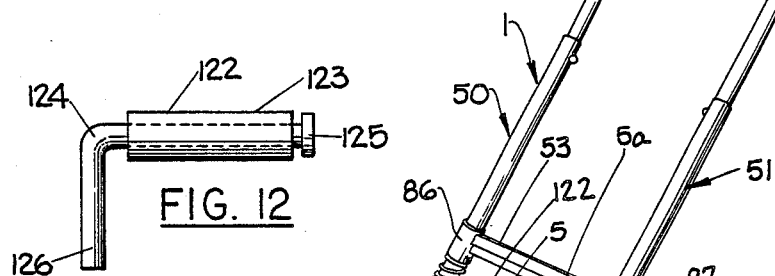
FIG. 12 is an elevational view of one of the latches of the auxiliary rear wheel assembly.

The forward end of leg portion 121c of strut element 121 has a latch member 122 welded thereto. The latch member 122 is illustrated in FIG. 12. Latch member 122 comprises a short tubular element 123. Rotatively mounted within tubular member 123 there is a rod-like member 124 which is provided with a head 125 at one end. The free end of element 124 is bent downwardly as at 126, to form a hook-like element. It will be appreciated that the element 124 is captive within tubular member 123. An identical mirror-image latch member 127 is welded to tubular member 120 of base frame element portion 105. The purpose of latch members 122 and 127 will be described hereinafter.

Figure 14:
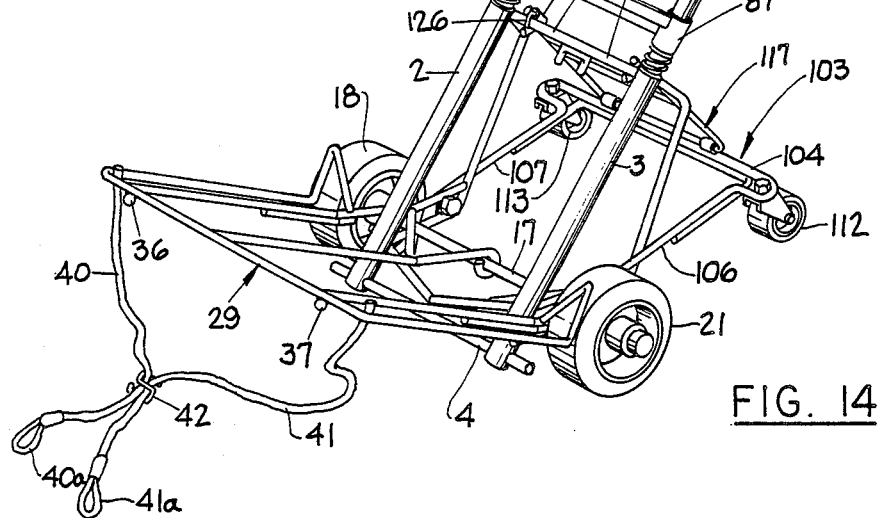
FIG. 14 is a perspective view illustrating the cart of FIG. 1 with the auxiliary rear wheel assembly attached thereto.

Reference is now made to FIG. 13. FIG. 13 illustrates the cart 1, and the auxiliary rear wheel assembly 103 in a perspective, exploded view. In FIG. 13, a bolt 128 is shown, adapted to be threadedly engaged in the nut 27 of the main frame assembly. A second bolt 129 is similarly arranged to be threadedly engaged in the nut 26 of the main frame assembly. Nut 26 is not shown in FIG. 13, but is shown in FIGS. 1 and 3. When bolts 128 and 129 are threadedly engaged in their respective nuts 27 and 26 the bolt shanks will extend beyond their respective nuts. To attach base frame element 104 of auxiliary rear wheel assembly 103 to cart 1, it is only necessary to spread base frame element legs 106 and 107 slightly so that the loops 106a and 107a thereof can be engaged on the shanks of bolts 129 and 128, respectively. This provides a pivotal attachment of the auxiliary rear wheel assembly to cart 1. To rigidify the auxiliary rear wheel assembly 103 with respect to cart 1, the strut assembly 117 is raised upwardly and the V-shaped notches formed by the free ends of the legs of members 118 and 121 are so positioned as to receive the transverse portion 5a of upper transverse brace 5, as shown in FIG. 14. Once this has been accomplished, the hook-like end 126 of latch member 122 is turned down over upper transverse brace portion 5a, and the auxiliary rear wheel assembly is thereby locked in place.

If the auxiliary rear wheel assembly 103 is not to be used for a period of time, the latch 122 can be unlatched, strut assembly 117 can be lowered, and the legs 106 and 107 of base frame element 104 can be slightly spread to disengage them from bolts 129 and 128, respectively. As a result, the auxiliary rear wheel assembly is disengaged from cart 1 without tools and can be stored separately therefrom.

An advantage of the auxiliary rear wheel assembly 103 of the present invention lies in the fact that it can be pivoted and locked in a storage position directly on cart 1. This is advantageous, for example, when the auxiliary rear wheel assembly 103 is frequently, but not always used. FIG. 15 illustrates the stored position of auxiliary rear wheel assembly 103 on cart 1. To achieve the stored position illustrated in FIG. 15, it is only necessary to unlatch the auxiliary rear wheel strut assembly 117 from portion 5a of the upper transverse brace member 5 and pivot the strut assembly 117 downwardly. Thereafter, the base frame assembly 104 of the auxiliary rear wheel assembly is pivoted upwardly about bolts 128 and 129 until latch element 127 can be engaged on the portion 5a of upper transverse brace 5, as shown in FIG. 15. The free ends of the strut assembly 117 should be located in front of cart axle 17.

The cart 1, provided with the auxiliary rear wheel assembly 103 can be stored or carried in its fully retracted position, as shown in FIG. 16. FIG. 16 differs from FIG. 15 only in that platform 29 has been folded to its stored position. Security cords 40 and 41 are then used to maintain platform 29 in its stored position and telescoping handle assembly in its retracted position, in the same manner described with respect to FIG. 10. To this end, security cords 40 and 41 are brought through grip 52 over its transverse member 82. The cords are then stretched along the back of the cart, including the stored auxiliary rear wheel assembly. The cords are brought about axle 17 and lower transverse brace 4. Thereafter, the cords extend upwardly along the underside of platform 29, again over the transverse member 82 of grip 52 and downwardly, engaging the cord loops 40a and 41a on cleat 28. In the condition shown in FIG. 16, the cart, together with its auxiliary rear wheel assembly can be easily carried or stored.

The use of the cart in the configuration illustrated in FIG. 14 can be described as follows. To load the cart, the cart is shifted to its upright position similar to that shown in FIG. 1. In its upright position, the cart rests on its main wheels 18 and 21, the lower ends of tubular main frame members 2 and 3 and the feet 36 and 37 of platform 29. In this upright position, the load is placed upon platform 29 and the security cords 40 and 41 are stretched over the load, with their looped ends 40 and 40a engaged on grip cleats 83 and 84. Thereafter, the operator places his or her foot on one of the main wheels and tilts the cart rearwardly with grip 52 until all four wheels 18, 21, 112 and 113 rest on the supporting surface.

The auxiliary rear wheel assembly is to be used with a load having an appropriately high center of gravity. If the load is such that the cart will remain with all four of its wheels on the supporting surface (without any additional effort on the part of the operator), then use of the auxiliary rear wheel assembly is proper and advantageous. If the operator must hold the wheels of the auxiliary rear wheel assembly against the supporting surface, then use of the auxiliary rear wheel assembly is not recommended and the assembly should be folded to its stored position, or removed.

It will be readily understood that the auxiliary rear wheel system should be located in its stored position before attempting to ascend or descend stairs, curbs or the like, using the portions 5c and 5f of transverse brace 5 as skids or slides.

As is shown in FIG. 17, the cart 1 of the present invention, when in the configuration illustrated in FIG. 14, can be provided with an upper horizontal tray. The tray is generally indicated at 130 in FIG. 17. The tray 130 comprises a continuous, substantially rectangular, peripheral member made of rod stock. The peripheral member is indicated at 131 and has a forward portion 131a, side portions 131b and 131c and a rear portion 131d. The tray 130 is provided with a series of rod-like elements 132, 133 and 134 which extend parallel to the side portions 131b and 131c. The elements 132–134 have their forward ends butted against and welded to the forward portion 131a of peripheral member 131. The rearward ends of elements 132–134 lie atop the rear portion 131d of peripheral member 131 and are welded thereto. A U-shaped, rod-like member 135 has a base portion 135a and a pair of parallel legs 135b and 135c. The free ends of legs 135b and 135c abut the forward portion 131a of peripheral member 131 and are welded thereto. The legs, near their rearward ends, extend over the rearward portion 131d of peripheral member 131 and are welded thereto. It will be noted that the base portion 135a is spaced rearwardly from the rearward portion 131d of peripheral member 131. The ends of the forward portion 131a and rear portion 131d of peripheral member 131 are angled slightly upwardly so that side portions 131b and 131c are more nearly coplanar with elements 132–134.

A pair of latch members to be described more fully hereinafter, are shown at 136 and 137. Latch 136 is welded to the rearward portion 131d of peripheral member 131 and the adjacent portion of the leg 135b of U-shaped member 135. Similarly, latch 137 is welded to the rearward portion 131d of peripheral member 131 and the adjacent portion of the leg 135c of U-shaped member 135. An additional L-shaped, rod-like brace 138 has the end of one of its legs welded to latch 136 and the end of its other leg welded to the side portion 131b of peripheral member 131. A similar L-shaped, rod-like brace 139 has the end of one of its legs welded to latch 137 and the end of its other leg welded to the side member 131c of peripheral member 131. A tubular member 140 is welded to the side portion 131b of peripheral member 131. A similar tubular member 141 is welded to the side portion 131c of peripheral member 131. The tubular members 140 and 141 are adapted to rotatively receive ends of supporting struts to be described hereinafter. Finally, tray 130 is completed by the provision of a pair of short, rod-like members 142 and 143. Members 142 and 143 are substantially coaxial and are parallel to the forward portion 131a of peripheral member 131. The ends of member 142 are welded to rod-like member 132 and the leg 135b of U-shaped member 135. Similarly, the ends of member 143 are welded to rod-like member 134 and the leg 135c of U-shaped member 135. The members 142 and 143 can be engaged by load tie-down members or the like.

Tray 130 is mounted on cart 1 by engagement of latches 136 and 137 on the tubular members 55 and 78, respectively, of the telescoping handle assembly 49. The tray 130 is further supported by a pair of struts 142 and 143. Strut 142 is illustrated in FIG. 18. The strut is made of rod stock and has a rectilinear body portion 142a. At its upper end, the strut 142 terminates in a forwardly extending portion 142b. At its lower end, the strut 142 bends downwardly as at 142c and terminates in a rearwardly extending hookshaped portion 142d. The strut 142 is completed by the provision of a small U-shaped member 144 welded to its elongated body portion 142a.

The strut 143 is a mirror image of strut 142 with two exceptions. First of all, the strut 143 is not provided with a U-shaped member similar to member 144 of strut 142. Secondly, the elongated body portion of strut 143 at about the same position as the mounting position of U-shaped member 144 on strut 142, is bent slightly rearwardly so that the strut 143 can lie in front of the strut 142 as shown in FIG. 17, while its hook-like portion will be properly aligned to engage portion 5a of upper transverse brace 5 of the cart.

To use the tray 30 of the present invention, the cart 1 is erected in the configuration shown in and described with respect to FIG. 14. The cart is rocked rearwardly so that it sits firmly on all four of its wheels. Struts 142 and 143 have their forwardly extending upper ends engaged in the tubular members 140 and 141 of tray 130. The elongated body portion of strut 143 is located in the U-shaped member 144 of strut 142, as shown in FIG. 17. The rearwardly extending hook-shaped portions of struts 142 and 143 are engaged on the portion 5a of transverse upper brace 5. The tray 130 is then rocked rearwardly until its latches 136 and 137 engage tubular members 55 and 78, respectively, of the handle assembly 49. When the latches 136 and 137 are locked in place, tray 130 is firmly mounted on cart 1.

Figure 19:
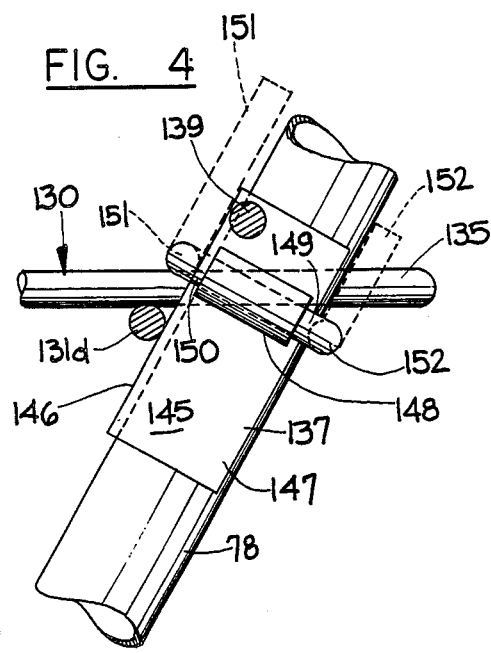
FIG. 19 is a fragmentary side elevational view of a latch of the present invention for engaging one of the tubular elements of the handle assembly.

Latch 137 is illustrated in FIG. 19. Latch 137 comprises a channel-shaped body 145 having a base portion 146 and a pair of rearwardly extending leg portions, one of which is shown at 147. The channelshaped body 145 of latch 137 is so dimensioned as to just nicely receive the tubular member 78 of tubular handle assembly 49. Welded to the latch leg portion 147 there is a tubular member 148. Captively and rotatively mounted in tubular member 148 there is the base portion 149 of a U-shaped member 150 made of rod stock. The base member 149 terminates at each end in legs 151 and 152. The U-shaped member 150 is shown in its latching position in solid lines and in its unlatched position in broken lines. It will be noted from FIG. 19 that the leg 151 is longer than the leg 152. When the U-shaped member 150 is pivoted from its unlatched position to its latching position, shorter leg 152 will clear the U-shaped member 135 of tray 130, but the longer leg 151 will rest against the top surface of the U-shaped member 135, determining the latching position of U-shaped member 150. It will be evident from FIGS. 17 and 19 that, when the U-shaped member 150 is in its latching position, the leg 152 will close the open side of channel member 145, locking the channel member 145 to the tubular member 78 of handle assembly 49. It will be understood that latch 136 is a mirror image of latch 137, and functions in precisely the same manner.

When the tray 130 is used, and the cart 1 is in the configuration illustrated in FIG. 17, both the tray 130 and the platform 129 can be loaded. The load on tray 130 should be heavier than the load on platform 29 to preclude the cart 1 from pitching forwardly. To remove tray 130 from cart 1, it is only necessary to disengage the latches 136 and 137 and lift the tray and its struts from the cart.

The cart of the present invention in its configuration illustrated in FIG. 14 (i.e., with its auxiliary rear wheel assembly 103), can be provided with another type of upper horizontal tray, next to be described. This structure comprises an undercarriage generally indicated at 153 in FIG. 20 and a tray member generally indicated at 154 in FIGS. 21 and 22.

Figure 20:
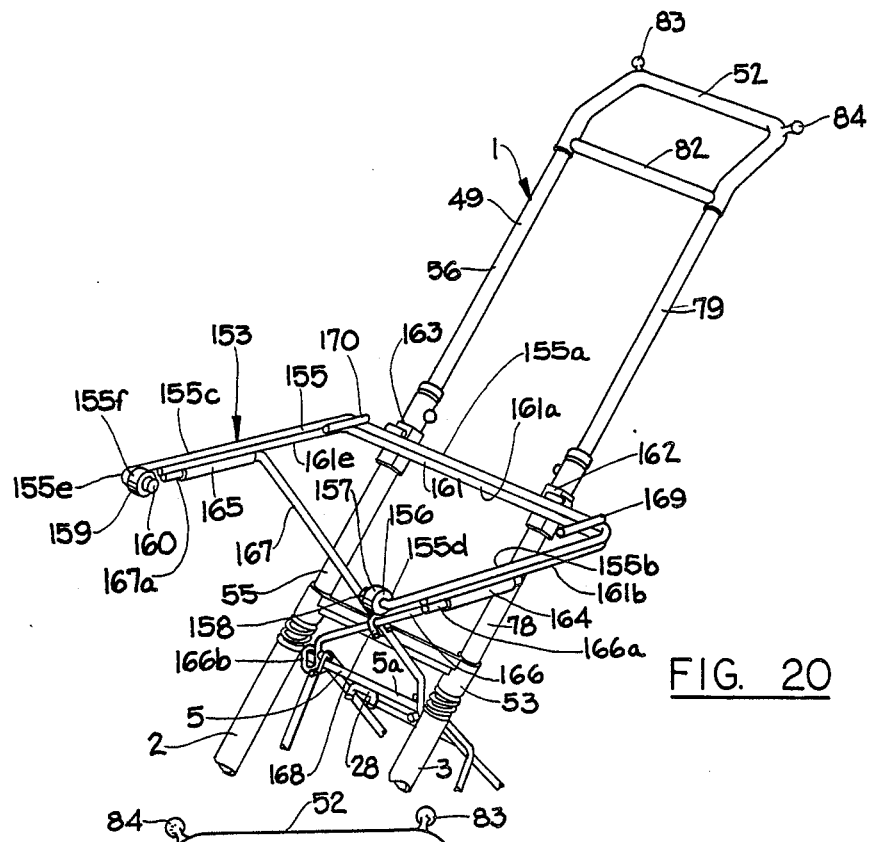
FIG. 20 is a fragmentary perspective view illustrating the cart of the present invention provided with its auxiliary rear wheel assembly and an upper tray undercarriage assembly.

Turning first to FIG. 20, the undercarriage 153 comprises a U-shaped member 155 made of rod stock. The member 155 has a base portion 155a, and forwardly extending leg portions 155b and 155c. The forwardmost end of leg portion 155b is inturned as at 155d. A bearing disc 156 is welded to the inturned end, which mounts a roller 157 held in place by a cap nut 158 which frictionally engages the inturned end 155d. In similar fashion, the free end of leg 155c is inturned as at 155e and provided with a bearing disc 155f, a roller 159 and a cap nut 160.

The U-shaped member 155 is welded to and reinforced by a second U-shaped member 161 having a base portion 161a, and forwardly extending leg portions 161b and 161c. U-shaped member 155 overlies U-shaped member 161 with the base portion 161a of member 161 being slightly forward of the base portion 155a of U-shaped member 155. This arrangement enables the welding of latch members 162 and 163 to portions 155a and 161a so that the latch members 162 and 163 will lie at the proper angle. The latch members 162 and 163 are mirror images of each other and are identical to latch members 136 and 137 of FIGS. 17 and 19. Latch members 162 and 163 operate in the same manner described with respect to latch member 137 of FIG. 19.

The forward parts of leg portions 161b and 161c of U-shaped member 161 have tubular members 164 and 165 welded thereto. Tubular members 164 and 165 are adapted to rotatively receive the forwardly directed ends 166a and 167a, respectively, of support struts 166 and 167. Support struts 166 and 167 are substantially identical to support struts 142 and 143, respectively. To this end, support strut 167 carries a U-shaped member 168 and terminates at its lower end in a rearwardly directed hook-like portion (not shown). Strut 166 terminates at its lower end in a similar rearwardly directed hook-like portion 166b. The elongated body portion of strut 166 is bent slightly rearwardly for the same reasons given with respect to strut 143 of FIG. 17. The lower hook-like ends of struts 166 and 167 are adapted to engage the portion 5a of upper horizontal brace 5. It will be apparent to one skilled in the art that the mounting of undercarriage 153 to cart 1 is accomplished in the same manner described with respect to the mounting of tray 130 (FIG. 17) to the cart 1. The undercarriage 153 is completed by a pair of short rod stock supports 169 and 170 welded to the base portion 155a of member 155. The purpose of supports 169 and 170 will be apparent hereinafter.

Figure 21:
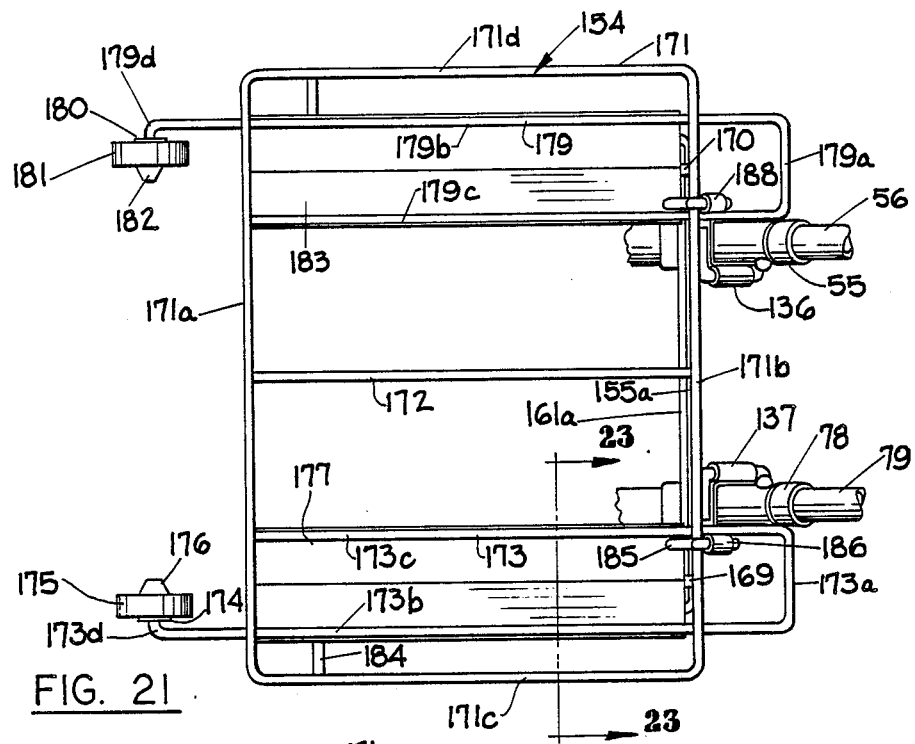
FIG. 21 is a plan view of a rollable upper tray mounted on the undercarriage of FIG. 19.
Figure 22:
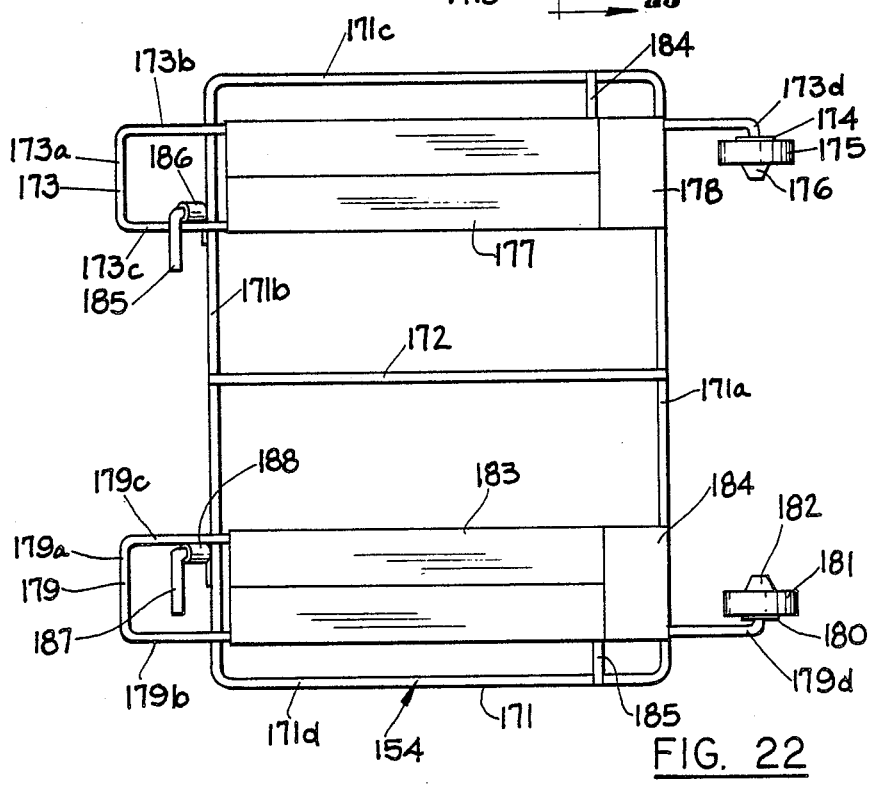
FIG. 22 is a bottom view of the rollable tray of FIG. 20.

Reference is now made to FIGS. 21 and 22. The tray 154 comprises a rectangular peripheral rod stock member 171 having a forward portion 171a, a rearward portion 171b and side portions 171c and 171d. Welded centrally of and to the underside of peripheral member 171 there is a rod stock member 172.

Near the side portion 171c of peripheral member 171 there is welded to the undersides of forward portion 176a and rearward portion 171b a U-shaped rod stock member 173 having a base portion 173a and forwardly extending leg portions 173b and 173c. It will be noted that the U-shaped member 173 extends rearwardly of the rear portion 171b of peripheral member 171. That portion of U-shaped member 173 extending rearwardly of the peripheral member portion 171b is angled upwardly and rearwardly at an angle of about 45° or more (see FIG. 24), and serves as a handle for tray 154. Leg portion 173c terminates at the forward portion 171a of peripheral member 171. Leg portion 173b extends forwardly of the peripheral member portion 171a. That part of leg portion 173b extending forwardly of the peripheral member portion 171a slopes downwardly at a shallow angle and terminates in an inturned end 173d (see FIG. 24). The inturned end 173d has welded thereto a bearing disc 174 and carries a roller 175 held thereon by friction nut 176.

Within the confines of peripheral member 171, a sheet metal guideway 177 is welded to the leg portions 173b and 173c of U-shaped member 173. As can best be seen in FIG. 23, the sheet metal guideway has a W-shaped cross section. This cross section enables the guideway 177 to be self-centering with respect to the roller 157 of undercarriage 153. An L-shaped plate 178 is welded to the forward end of guideway 177. The vertical leg of plate 178 closes the forward end of guideway 177. The horizontal leg of plate 178 overlies the forwardmost portion of the bottom of guideway 177 (see FIGS. 22 and 24). Therefore, the plate 178 forms a socket at the forwardmost end of guideway 177.

Near the side portion 171d of peripheral member 171, a U-shaped member 179 is welded to the undersides of forward portion 171a and the rearward portion 171b of peripheral member 171. The U-shaped member 179 is a mirror image of U-shaped member 173, having a base portion 179a and leg portions 179b and 179c. The leg portion 179b has an inturned end 179d to which a bearing disc 180 is welded. The inturned end 179d carries a roller 181 and a cap nut 182 equivalent to roller 175 and cap nut 176. The end most portion of leg 179, outside the forward portion 171a of peripheral member 171 angles downwardly in the same manner described with respect to leg portion 173b of U-shaped member 173. The portion of U-shaped member 179 extending beyond the rear portion 171b of peripheral member 171 angles upwardly in the same manner described with respect to the same portion of U-shaped member 173, and constitutes a second handle for tray 154. A sheet metal guideway 183 is welded to the legs 179b and 179c of U-shaped member 179 and is identical to guideway 177. The forward end of guideway 183 is closed by an L-shaped plate 184, constituting a mirror image of plate 178. A short rod-like brace 184 is welded at one end to the side portion 171c of peripheral member 171 and to the side portion of guideway 177. A similar short rod-like brace 185 is welded at one end to the side portion 171d of peripheral member 171 and to the side of guideway 183. The tray 154 is completed by the provision of a U-shaped latch captively and rotatively mounted in a tubular member 186 welded to leg portion 173c of U-shaped member 173. Similarly, a second latch, comprising a U-shaped member 187 rotatively and captively mounted in a tubular member 188, is welded to the leg portion 179c of U-shaped member 179.

The undercarriage 153 and the tray 154 having been described in detail, the manner in which they are used can now be described.

As indicated above, undercarriage 153 is intended to be mounted on the cart 1 in its configuration illustrated at FIG. 14. The undercarriage 153 is mounted to cart 1 in the same manner described with respect to tray 130 of FIG. 17. To this end, struts 166 and 167 are affixed to the undercarriage and their lower hook-shaped ends are engaged on the portion 5a of upper transverse brace 5. The undercarriage 153 is rocked rearwardly until the latches 162 and 163 engage and are locked on tubular members 78 and 55 of handle assembly 49.

The tray 154 rests on an appropriate surface such as the rear deck of a station wagon or a van. The load to be carried is mounted on tray 154 and is strapped thereto. The tray 154 can be provided with a series of appropriate straps affixed thereto and having quick release buckles. Such straps are not shown in the figures for purposes of clarity, but are well-known in the art.

The cart 1, with undercarriage 153 is caused to approach tray 154 from the rear. The spring detents which lock tubular members 56 and 79 with respect to tubular members 55 and 78, respectively, are manually depressed and the uppermost tubular members 56 and 79 are shifted to their collapsed or retracted positions. Thereafter, the cart operator reaches over the grip 52 of the cart and grasps the upturned handle portions of U-shaped member 173 and 179 of tray 154. Lifting slightly, the cart operator rolls the tray onto undercarriage 154, the operator placing one foot on the auxiliary rear wheel assembly to assure that the cart does not shift rearwardly. The cross section of guideways 177 and 183 will tend to center the tray 154 on undercarriage 153 and the tray is pulled rearwardly until guideways 177 and 183 rest on supports 169 and 170, respectively (see FIGS. 20 and 21). When the tray 154 is fully seated on undercarriage 153, the rollers 157 and 159 of the undercarriage will be received in the sockets formed at the forward ends of guideways 177 and 183 by plates 178 and 184, respectively. At this point, the U-shaped latch members 185 and 187 of tray 154 can be swung to the position shown in FIG. 21, engaging the rearward portions 155a and 161a of the U-shaped members 155 and 161 of undercarriage 153, thereby locking tray 154 in place. The handle assembly 149 can then be pulled to its fully extended position and the cart and its load can be rolled to a desired destination. When the tray 154 is to be unloaded from undercarriage 153, again the upper portion of the telescoping handle assembly 149 is shifted to its retracted position. The latches 185 and 187 are rotated to their unlocked positions and, grasping the tray by the base portions 173a and 179a of U-shaped members 173 and 179, the tray 154 is rolled off of undercarriage 153 onto the desired surface using its rollers 175 and 181. Alternatively, the tray 154 can remain locked on undercarriage 153 and the load thereon may simply be unstrapped and lifted from tray 154 onto the desired supporting surface.

The cart of the present invention may be provided with a heavy duty platform, having auxiliary forward wheels, for use with heavy loads up to 150 pounds or more.

The cart is utilized in the configuration illustrated in FIG. 1, with its platform 29 locked in its load-carrying position. In FIG. 25, for purposes of clarity, the platform locking means 43 (illustrated in FIG. 17 and described with respect thereto) has been eliminated.

The auxiliary platform is generally indicated in FIG. 25 at 189. The auxiliary platform 189 comprises a peripheral rod stock member 190 having a rectangular configuration. The member 190 has a forward portion 190a, a rearward portion 190b and side portions 190c and 190d. A plurality of rectalinear rod-like members 191 through 194 extend from the front portion 190a to the rear portion 190b of peripheral member 190 and are welded thereto at both ends. A transverse rod-like member is shown at 195. The transverse rod-like member extends beneath the side portions 190c and 190d of peripheral member 190 as well as members 191 through 194, and is welded thereto. Just ahead of member 195, each of members 191 and 194 has a tubular member welded thereto. These tubular members are shown at 196 and 197 and comprise mounting sockets, the purpose of which will be apparent hereinafter. Platform 189 is provided with a pair of U-shaped hooks 198 and 199 welded respectively to elements 193 and 192. The purpose of these hooks will be apparent hereinafter. Platform 189 is provided with a pair of mirror image latch members 200 and 201. These latch members are substantially identical to latch member 137 described with respect to FIG. 17 and 19, and operate in the same manner. The latch members 200 and 201 are sized to engage and lock upon main frame tubular members 2 and 3, as will be described. A latch 202 of the type illustrated and described with respect to FIG. 12 is welded to member 193. The purpose of latch 202 will be set forth hereinafter A short rod-like member 202a is welded to members 192 and 193 and can serve as a mount for a tie-down strip (not shown).

The heavy duty platform 189 is provided with its own forward wheel assembly. The wheel assembly is made up of a pair of wheel units 203 and 204. Wheel unit 203 comprises a replaceable caster 205, preferably of the lockable type. Caster 205 is pivotally affixed to a wheel mount 206 by bolt means or the like. Welded to wheel mount 206 there is a pair of wheel struts 207 and 208 which extend upwardly and rearwardly. The upper end of wheel strut 208 is welded to wheel strut 207 and the free end of wheel strut 207 is received in tubular socket 196.

Wheel unit 204 is substantially the same as wheel unit 203 and comprises a replaceable caster 209 pivotally attached to a wheel mount 210. Again, caster 209 is preferably of the lockable type. Welded to wheel mount 210 there is a pair of wheel struts 211 and 212. The upper end of wheel strut 212 is welded to wheel strut 211. The free end of wheel strut 211 is receivable within tubular socket 197.

Wheel strut 212 of wheel unit 204 has a short tubular member 213 welded thereto. In similar fashion, wheel strut 208 of wheel unit 203 has a tubular member 214 welded thereto. Tubular members 213 and 214 comprise sockets adapted to receive the downturned ends of a horizontal, rod-like brace 215. The brace 215 rigidifies and aligns the wheel units 203 and 204 and prevents their rotation within sockets 196 and 197. Horizontal brace 215 can be rendered captive in sockets 213 and 214, if desired, by enlarging the ends of the downturned portions of brace 215 with weld material. Wheel struts 211 and 212 of wheel unit 204 have a hook like element 216 affixed thereto. Struts 207 and 208 of wheel unit 203 have a similar hook-like element 217 welded thereto. These hook-like elements 216 and 217 engage the side portions of platform 29 when the heavy duty platform 189 is mounted on the cart 1.

The structure of the heavy duty cart and its wheel assembly having been described, its use can be set forth as follows.

When the cart 1 is set up in the manner illustrated in FIG. 1, the heavy duty platform 189 can be applied thereto. Wheel units 203 and 204 are mounted in their respective sockets 196 and 197, and transverse brace 215 is mounted in tubular wheel sockets 213 and 214, if not captive therein The cart 1 is tilted back slightly so that hook elements 198 and 199 of heavy duty platform 189 can be engaged on the forward portion 35a of the peripheral member 35 of platform 29. As this is done, the hook elements 216 and 217 of wheel units 203 and 204 will engage the side peripheral portions 35c and 35b of platform 29. The latch elements 200 and 201 are then engaged upon and locked onto tubular main frame members 3 and 2, respectively. Finally, the latch 202 of platform 189 is locked onto the forward portion 35a of the peripheral member 35 of platform 29.

It will be understood that heavy duty platform 189 may be provided with load-securing straps having quick release buckles and the like. For purposes of clarity, such straps have been eliminated in FIG. 25. Heavy duty platform 189 can also be applied to cart 1 together with the rear wheel assembly 103 of FIG. 14. This would be true when the cart 1 is to be used with both the heavy duty platform 189 and the auxiliary tray 130 of FIG. 17 or the auxiliary tray 154 of FIGS. 21 and 22.

From the foregoing description, it will be apparent that the cart of the present invention is simple in construction, very easy to shift between its fully extended position and its retracted position, and can be provided with various attachments rendering it extremely versatile.

Herein and in the claims, terms such as "forward," "rearward," "upwardly," "downwardly," and the like are used in conjunction with the drawings for purposes of clarity.

Modifications may be made in the invention without departing from the spirit of it.

What is claimed is:

1. A lightweight, portable, article carrying cart comprising a main frame supported by a pair of wheels, said main frame comprising a pair of upright tubular members maintained in parallel spaced relationship by a first transverse rod-like brace passing through coaxial perforations near the lower ends of said main frame tubular members and releasably affixed thereto, a second rod-like brace having a central portion welded to the rear surfaces of said main frame tubular members near the upper ends thereof, and a third M-shaped rod-like brace having a central V-shaped portion terminating in rearwardly extending legs, the junctures of said legs and said V-shaped portion being welded to the rear surfaces of said main frame tubular members near the lower ends thereof and above said first brace, said second brace central portion terminating at each end in extensions comprising first rearwardly extending portions followed by second downwardly and rearwardly extending portions followed by third downwardly and forwardly extending portions terminating in free ends each welded to one of said main framed tubular members, said extensions comprising stair and curb skids, each of said legs of said third brace being welded to said downwardly and rearwardly extending portion of the adjacent one of said skids, each of said legs of said third brace being parallel and substantially coplanar with said downwardly and forwardly extending portion of the adjacent one of said skids, a nut-like member welded to each of said third brace legs and the adjacent downwardly and forwardly extending skid portion, a rod-like shaft extending between said nut-like members and welded thereto with end portions extending through said nut-like members, said shaft comprising an axel with a wheel rotatively mounted on each of its end portions, said cart main frame supporting a telescoping handle assembly shiftable between retracted and extended conditions, and said main frame supporting a load carrying lower platform shiftable thereon between a load carrying position and a stowed position.

2. The cart claimed in claim 1 wherein said lower platform comprises a substantially rectangular openwork frame work made up of a plurality of rod-like members welded together and defining a front edge and side edges, selected ones of said rod-like members being in parallel spaced relationship to each other and said side edges, said selected members having one end welded to said lower platform front edge and the other end formed into a loop through which said axel passes, said lower platform being pivoted about said axel between said load carrying and stowed positions, latch means to releasably lock said lower platform in said load carrying position, said lower platform having small feet welded to its front edge, said cart, when upright on a surface, being supported on said surface by said wheels, the lower ends of said main frame tubular members and said lower platform feet.

3. The cart claimed in claim 1 wherein said telescoping handle assembly comprises two telescoping tubular assemblies, each of said telescoping tubular assemblies comprises first, second and third tubular members having upper and lower ends, the first tubular member of each assembly has an outside diameter such that it is just nicely received in and supported by one of said main, frame tubular members, said first transverse brace passes through coaxial perforations in each of said first tubular members of said assemblies near the lower end thereof locking it in its respective main frame tubular member and precluding axial movement thereof within its respective main frame tubular member, each of said first tubular members having an exposed upper end portion extending beyond its respective main frame tubular member, each second tubular member being slidably and captively mounted within its respective one of said first tubular members, and being shiftable therein between a retracted position wherein the majority of its length is within its respective first tubular member and an extended position wherein the majority of its length is outside its respective first tubular member, each third tubular member being slidable and captively mounted within its respective one of said second tubular members, and being shiftable therein between a retracted position wherein the majority of its length is within its respective second tubular member and an extended position wherein the majority of its length is outside its respective tubular member, said upper ends of said third tubular members being joined by a grip, a releasable spring biased detent mounted in each of said second and third tubular members near said lower ends thereof, said detent of each second tubular member extending through coaxial holes in said second tubular member and the adjacent first tubular member when said second tubular member is in its extended position, said detent of each of said third tubular members extending through coaxial holes in said third tubular member and the adjacent second tubular member when said third tubular member is in its extended position whereby to releasably lock said handle assembly in its extended condition.

4. The cart claimed in claim 3 wherein said lower platform comprises a substantially rectangular openwork frame work made up of a plurality of rod-like members welded together and defining a front edge and side edges, selected ones of said rod-like members being in parallel spaced relationship to each other and said side edges, said selected members having one end welded to said lower platform front edge and the other end formed into a loop through which said axel passes, said lower platform being pivoted about said axel between said load carrying and stowed positions, latch means to releasably lock said lower platform in said load carrying position, said lower platform having small feet welded to its front edge, said cart, when upright on a surface, being supported on said surface by said wheels, the lower ends of said main frame tubular members and said lower platform feet.

5. The cart claimed in claim 3 including a single release bar, said release bar comprising an elongated member terminating at its ends in cylindrical sockets, said upper end portions of said first tubular members each extending through one of said sockets, each release bar socket being axially slidable on its respective first tubular member end portion between an upper normal position and a lower release position, a compression spring mounted on said end portion of each first tubular member between the upper end of the adjacent main frame tubular member and the adjacent release bar socket to bias said release bar to its upper normal position, each of said sockets having an upper interior cam surface and a lower interior cam surface, when said release bar is in its lower release position, said lower cam surfaces of said sockets are so positioned as to shift the detents of said second tubular members to their release positions permitting said second tubular members to telescope into said first tubular members and said upper cam surfaces of said sockets are thereafter so positioned as to shift said detents of said third tubular members to their release positions permitting said third tubular members to telescope into said second tubular members so that said handle assembly achieves its retracted condition.

6. The cart claimed in claim 5 wherein said lower platform comprises a substantially rectangular openwork frame work made up of a plurality of rod-like members welded together and defining a front edge and side edges, selected ones of said rod-like members being in parallel spaced relationship to each other and said side edges, said selected members having one end welded to said lower platform front edge and the other end formed into a loop through which said axel passes, said lower platform being pivoted about said axel between said load carrying and stowed positions, latch means to releasably lock said lower platform in said load carrying position, said lower platform having small feet welded to its front edge, said cart, when upright on a surface, being supported on said surface by said wheels, the lower ends of said main frame tubular members and said lower platform feet.

7. The cart claimed in claim 3 including a pair of elastic security cords, one end of each security cord being attached to said lower platform at the juncture of said front edge and a side edge thereof, the other end of each cord being formed into a loop, said grip and said second rod like brace each having a pair of cleats formed thereon, said looped ends of said cords being engageable on any of said cleats.

8. The cart claimed in claim 3 including an auxiliary rear wheel assembly, said auxiliary rear wheel assembly comprising a base frame element made of rod-like elements and having a generally U-shaped configuration including a base portion terminating in a pair of legs, a pair of casters each mounted at a juncture of said base portion and one of said legs, said legs each having a free end formed into a loop, a second nut welded to and between each of said legs of said third M-shaped brace and the downwardly and forwardly extending portion of the adjacent slide, a bolt engaged in each of said nuts and extending through said looped end of one of said base frame element legs, a strut assembly made of rod-like elements and having a U-shaped configuration comprising a base portion terminating in a pair of legs, said base portion of said base frame element having a pair of tubes welded thereto, said base portion of said strut assembly passing through said tubes and being rotatable therein, said auxiliary rear wheel assembly being manually attachable to and detachable from said cart without tools, said auxiliary rear wheel assembly having a working condition and a stowed condition with respect to said cart, in said working condition said base frame element extends rearwardly of said cart, said strut assembly extending forwardly and upwardly from said base portion of said base frame element, said strut assembly legs having free ends configured to engage said second rod-like brace of said main frame, one of said strut assembly legs having latch means releasably engaging said second rod-like brace to maintain said auxiliary rear wheel assembly in its working condition, in said stowed condition said strut assembly is pivoted at said base frame element base portion to a position lying along said base frame element and said base frame element is pivoted about said bolts upwardly to a position wherein said strut assembly and said base frame assembly base portions approach said second rod-like brace, said base portion of said base frame element having latch means releasably engaging said second brace to maintain said auxiliary rear wheel assembly in its stowed condition.

9. The cart claimed in claim 3 including a heavy duty auxiliary lower platform, manually attachable to said lower platform when locked in said load carrying position and to said main frame tubes, said auxiliary lower platform comprises a plurality of rod-like members welded together to form a rectangular structure having forward, side and rearward edges, a plurality of rectilinear rod-like members are arranged in parallel spaced relationship to said side edges and to each other and are affixed at their ends to said forward and rearward edges, selected ones of said rectilinear rod-like members are provided with hook means engageable with the forward edge of said lower platform, said rearward edge of said auxiliary lower platform has latch means mounted thereon configured to engage and releasably latch onto the main frame tubular members, first and second casters are each mounted on rod-like supports, said rod-like supports having free ends removably receivable in tubular sockets affixed to selected ones of said rectilinear rod-like members of said auxiliary lower platform, said caster supports being configured to locate said casters near said forward edge of said auxiliary platform.

10. The structure claimed in claim 8 including an upper horizontal tray, said tray comprising an open work structure made up of rod-like members welded together to form a substantially rectangular tray having forward, side and rearward edges, latch means affixed to said tray rearward edge and being so located thereon and so configured as to engage and releasably lock onto said second tubular members of said telescoping tubular assemblies of said handle assembly when in its extended condition, a pair of struts having upper and lower ends, a tubular socket welded to each side edge of said tray, said upper end of each strut is angularly related to the remainder of said strut and is receivable in one of said tubular sockets, the lower end of each strut has a hook-like configuration, said struts are rotated in their respective sockets so as to cross each other, said hook-like lower strut ends engaging said second rod-like brace of said main frame.

11. The cart claimed in claim 8 including an upper horizontal tray assembly, said tray assembly comprising an undercarriage and a tray shiftable on to and off of said undercarriage, said undercarriage comprising a U-shaped member made up of rod-like elements and having a base portion terminating at its ends in parallel legs, latch means being affixed to said undercarriage base portion and being so located thereon and configured as to engage and releasably lock onto said second tubular members of said telescoping tubular assemblies of said handle assembly when in its extended condition, a tubular socket welded to each of said undercarriage legs, a pair of struts having upper and lower ends, said upper end of each strut being angularly related to the remainder of that strut and receivable in one of said tubular sockets, the lower end of each strut having a hook-like configuration, said struts being rotated in their respective sockets so as to cross each other, said hook-like lower strut ends engaging said second rod-like brace of said main frame, said undercarriage, when so releasably attached to said cart, being substantially horizontal, the forward ends of said undercarriage being inturned toward each other, a roller mounted on each of said inturned leg ends, said tray comprising a rectangular open work structure made up of rod-like elements welded together and having forward, side and rearward edges, said tray having rollers mounted on struts extending forwardly of said forward edge, said tray having handle elements extending rearwardly of said rearward edge, said tray having a pair of guideways extending from its forward edge to its rearward edge and so spaced as to cooperate with said undercarriage rollers permitting said tray to be rolled onto and off of said undercarriage, said tray having latch means mounted on its handle portions and engageable with the base portion of said undercarriage to latch said tray on said undercarriage.

12. A lightweight, portable, article carrying cart comprising a main frame, said main frame comprising a pair of upright tubular members, brace means maintaining said main frame tubular members in parallel spaced relationship, said brace means including as transverse rod-like brace passing through coaxial perforations near the lower ends of said main frame tubular members and releasably affixed thereto, an axle operatively affixed to said main frame and extending transversely thereof, a pair of wheels being rotatively mounted on the ends of said axle, said cart main frame supporting a load carrying lower platform shiftable thereon between a load carrying position and a stowed position, said main frame supporting a telescoping handle assembly shiftable between retracted and extended conditions, said telescoping handle assembly comprising two telescoping tubular assemblies, each of said telescoping tubular assemblies comprises first, and second and third tubular members having upper and lower ends, the first tubular member of each assembly has an outside diameter such that it is just nicely received in and supported by one of said main frame tubular members, said transverse rod-like brace passes through coaxial perforations in each of said first tubular members of said assemblies near the lower end thereof locking it in its respective main frame tubular member and precluding axial movement thereof within its respective main frame tubular member, each of said first tubular members having an exposed upper end portion extending beyond its respective main frame tubular member, each second tubular member being slidably and captively mounted within its respective one of said first tubular members, and being shiftable therein between a retracted position wherein the majority of its length is within its respective first tubular member and an extended position wherein the majority of its length is outside its respective first tubular member, each third tubular member being slidably and captively mounted within its respective one of said second tubular members, and being shiftable therein between a retracted position wherein the majority of its length is within its respective second tubular member and an extended position wherein the majority of its length is outside its respective tubular member, said upper ends of said third tubular members being joined by a grip, a releasable spring biased detent mounted in each of said second and third tubular members near said lower end thereof, said detent of each second tubular member extending through coaxial holes in said second tubular member and the adjacent first tubular member when said second tubular member is in its extended position, said detent of each of said third tubular members extending through coaxial holes in said third tubular member and the adjacent second tubular member when said third tubular member is in its extended position whereby to releasably lock said handle assembly in its extended condition.

13. The cart claimed in claim 12 including a single release bar, said release bar comprising an elongated member terminating at its ends in cylindrical sockets, said upper end portions of said first tubular members each extending through one of said sockets, each release bar socket being axially slidable on its respective first tubular member end portion between an upper normal position and a lower release position, a compression spring mounted on said end portion of each first tubular member between the upper end of the adjacent main frame tubular member and the adjacent release bar socket to bias said release bar to its upper normal position, each of said sockets having an upper interior cam surface and a lower interior cam surface, when said release bar is in its lower release position, said lower cam surfaces of said sockets are so positioned as to shift the detents of said second tubular members to their release positions permitting said second tubular members to telescope into said first tubular members and said upper cam surfaces of said sockets are thereafter so positioned as to shift said detents of said third tubular members to their release positions permitting said third tubular members to telescope into said second tubular members so that said handle assembly achieves its retracted condition.

14. The cart claimed in claim 12 including accessory supporting means on said main frame tubular members near the upper ends thereof.

* * * * *

UNITED STATES PATENT AND TRADEMARK OFFICE
CERTIFICATE OF CORRECTION

PATENT NO. : 4,896,897
DATED : January 30, 1990
INVENTOR(S) : Paul K. Wilhelm

It is certified that error appears in the above-identified patent and that said Letters Patent is hereby corrected as shown below:

In Claim 3:

Col. 21, Line 38:   Delete the comma after the word "main".

In Claim 8:

Col. 23, Line 35:   Change "Y" to -- y --.

In Claim 12:

Col. 24, Line 60:   Change the word "as" to -- a --.

Signed and Sealed this

Eighth Day of January, 1991

Attest:

HARRY F. MANBECK, JR.

*Attesting Officer*   *Commissioner of Patents and Trademarks*